US012513451B2

United States Patent
Barros et al.

(10) Patent No.: US 12,513,451 B2
(45) Date of Patent: Dec. 30, 2025

(54) EARBUD-TO-EARBUD CROSS-ACKNOWLEDGEMENT AND COMMUNICATION RELAY

(71) Applicant: Google LLC, Mountain View, CA (US)

(72) Inventors: Daniel Barros, Sra da Hora (PT); Sunil Kumar, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 170 days.

(21) Appl. No.: 18/205,338

(22) Filed: Jun. 2, 2023

(65) Prior Publication Data

US 2024/0121549 A1    Apr. 11, 2024

Related U.S. Application Data

(60) Provisional application No. 63/440,047, filed on Jan. 19, 2023, provisional application No. 63/414,276, filed on Oct. 7, 2022.

(51) Int. Cl.
*H04R 1/10*    (2006.01)

(52) U.S. Cl.
CPC ......... *H04R 1/1091* (2013.01); *H04R 1/1016* (2013.01); *H04R 2201/107* (2013.01); *H04R 2420/07* (2013.01)

(58) Field of Classification Search
CPC .......................... H04R 1/1091; H04R 1/1016
See application file for complete search history.

(56) References Cited

U.S. PATENT DOCUMENTS

| | | | |
|---|---|---|---|
| 2018/0084456 A1* | 3/2018 | Gostev | H04L 1/1867 |
| 2021/0235528 A1 | 7/2021 | Morris et al. | |
| 2022/0039041 A1 | 2/2022 | Zhu | |
| 2022/0124471 A1 | 4/2022 | Chen | |
| 2022/0124553 A1* | 4/2022 | Chen | H04L 1/203 |
| 2022/0239413 A1 | 7/2022 | Hsieh | |
| 2023/0054769 A1 | 2/2023 | Solum et al. | |
| 2024/0032122 A1 | 1/2024 | Campbell et al. | |
| 2025/0227133 A1 | 7/2025 | Yoon et al. | |

* cited by examiner

*Primary Examiner* — Simon King
(74) *Attorney, Agent, or Firm* — DORITY & MANNING P.A.

(57) ABSTRACT

Various arrangements for short-range wireless communication between audio output devices, such as true wireless earbuds, are presented herein. A first earbud of a pair of earbuds may determine that a first audio packet addressed to the first earbud from an audio source was not properly received. However, a second earbud of the pair of earbuds may properly receive the first audio packet addressed to the first earbud. The second earbud can then, directly to the first earbud, transmit a cross acknowledgement indicating that the second earbud properly received the audio packet.

17 Claims, 14 Drawing Sheets

EARBUD-TO-EARBUD CROSS-ACKNOWLEDGEMENT AND COMMUNICATION RELAY

CROSS-REFERENCES TO RELATED APPLICATIONS

This application claims priority to, and the benefit of U.S. Provisional Patent Application No. 63/414,276, filed Oct. 7, 2022, the entire disclosure of which is incorporated by reference in its entirety.

This application additionally claims priority to and the benefit of U.S. Provisional Patent Application No. 63/440,047, filed Jan. 19, 2023, the entire disclosure of which is incorporated by reference in its entirety.

BACKGROUND

Near range wireless communications, such as using a Bluetooth communication protocol, between devices continues to grow in popularity and permeate society. Users demand a high-quality user experience, which can involve uninterrupted audio streams and the ability to communicate with multiple wireless devices simultaneously. One of the major challenges to enable new use cases is the available communication bandwidth.

SUMMARY

Various embodiments are described related to a short-range communication system. In some embodiments, a short-range communication system is described. The system may comprise a pair of wireless earbuds that may comprise a first earbud, comprising a first speaker, a first processing system, and a first wireless communication interface, that may communicate with an audio source device using Bluetooth communications. The system may comprise a second earbud, comprising a second speaker, a second processing system, and a second wireless communication interface, that may communicate with the audio source device using Bluetooth communications. The first earbud and the second earbud may not be physically connected together and the pair of wireless earbuds may not be physically connected with the audio source device. The first earbud and the second earbud may be configured to wirelessly communicate with each other to acknowledge receipt of audio packets from the audio source device.

Embodiments of such a system may include one or more of the following features: the second processing system of the second earbud may be configured to, in response to successfully receiving a first audio packet addressed to the first earbud transmitted by an audio source, cause a cross acknowledgement to be transmitted directly to the first earbud by the second wireless communication interface, the cross acknowledgement indicating that the first audio packet was successfully received by the second earbud. The cross acknowledgment may be transmitted by the second earbud within a connected isochronous stream (CIS) subevent in which the first audio packet was received by the second earbud. The first processing system of the first earbud may be configured to determine that the first audio packet addressed to the first earbud failed to be properly received during the CIS subevent. The first processing system of the first earbud may be configured to receive the cross acknowledgement transmitted by the second earbud within the CIS subevent. The first processing system of the first earbud may be configured to, in response to receiving the cross acknowledgement and determining that the first audio packet failed to be properly received by the first earbud, cause an acknowledgement to be transmitted to the audio source. The first processing system of the first earbud may be configured to, in response to receiving the cross acknowledgement and determining that the first audio packet failed to be properly received by the first earbud, cause a request to be transmitted to the second earbud. The request may be transmitted by the first earbud within a CIS event in which the cross acknowledgment was transmitted by the second earbud. The second processing system of the second earbud may be configured to in response to receiving the request from the first earbud, cause audio data from the first audio packet received from the audio source to be transmitted directly to the first earbud. The audio data may be transmitted during a same CIS event by the second earbud as during which the request was received by the second earbud. The short-range communication system may further comprise the audio source device. The audio source device may be a smartphone.

In some embodiments, a method for short-range wireless communication is described. The method may comprise determining, by a first earbud of a pair of earbuds, that an audio packet addressed to the first earbud from an audio source was not properly received. The method may comprise receiving, by a second earbud of the pair of earbuds from the audio source, the audio packet addressed to the first earbud. The method may comprise transmitting, by the second earbud directly to the first earbud, a cross acknowledgement indicating that the second earbud properly received the audio packet addressed to the first earbud.

Embodiments of such a method may include one or more of the following features: receiving, by the first earbud directly from the second earbud, the cross acknowledgement indicating that the second earbud may have properly received the audio packet addressed to the first earbud. The method may further comprise, based on the cross acknowledgement, transmitting, by the first earbud, an acknowledgment to the audio source indicating the audio packet was properly received despite having determined that the first earbud did not properly receive the audio packet. The method may further comprise transmitting, by the first earbud directly to the second earbud, a request for audio data from the audio packet. The method may further comprise transmitting, by the second earbud directly to the first earbud, the audio data from the audio packet in response to the request. The cross acknowledgment may be transmitted by the second earbud within a CIS subevent in which the audio packet failed to be properly received by the first earbud. The request may be transmitted by the first earbud within a CIS event in which the cross acknowledgment was transmitted by the second earbud. Bluetooth LE Audio may be used for communication between the audio source and the pair of earbuds. The request may be transmitted by the first earbud within a final subevent of a plurality of subevents within the CIS event. The audio packet may be audio corresponding to a telephone call in which the audio source is functioning as a call gateway and the pair of earbuds is functioning as a call terminal.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

By having a pair of true wireless earbuds communicate with each other, audio output performance can be significantly improved. Conventionally, if an audio packet is not received by a first earbud (which can be a left or right earbud), the first earbud requests retransmission of the audio packet from the audio source device. However, the communication link between the first earbud and the audio source may be weak, such as due to attenuation and interference. Therefore, retransmissions by the audio source may continue to fail to be properly received by the first earbud. Even if received, repeated retransmissions require the use of power at the audio source and at the first earbud, thus decreasing battery life of the audio source (if battery powered) and at least the first earbud.

As detailed herein, a communication link between earbuds, which can be outside of the audio communication standard used for communication between the audio source and earbuds (e.g., Bluetooth LE Audio), can allow a second earbud (which is in the user's opposite ear from the first earbud) to serve as a relay between the audio source and the first earbud.

In embodiments detailed herein, the second earbud can sniff the audio packet transmitted by the audio source and addressed (e.g., using an access address) to only the first earbud. The second earbud can then transmit a message, referred to herein as a cross acknowledgment, to the first earbud indicating that the audio packet was successfully received by the second earbud. If the first earbud failed to receive the audio packet but the second earbud has indicated that it received the audio packet, the first earbud can transmit an acknowledgement to the audio source (thus preventing retransmissions by the audio source). The first earbud can then retrieve the audio data that was present in the audio packet from the second earbud and subsequently output audio based on the audio data.

Further detail regarding embodiments involving cross acknowledgements and communication among earbuds are detailed herein. While this document focuses on communication among earbuds, it should be understood that at least some embodiments detailed herein can have additional applicability. For example, wireless stereo speakers (e.g., for a home entertainment system) could use similar arrangements to improve performance.

Figure 1:
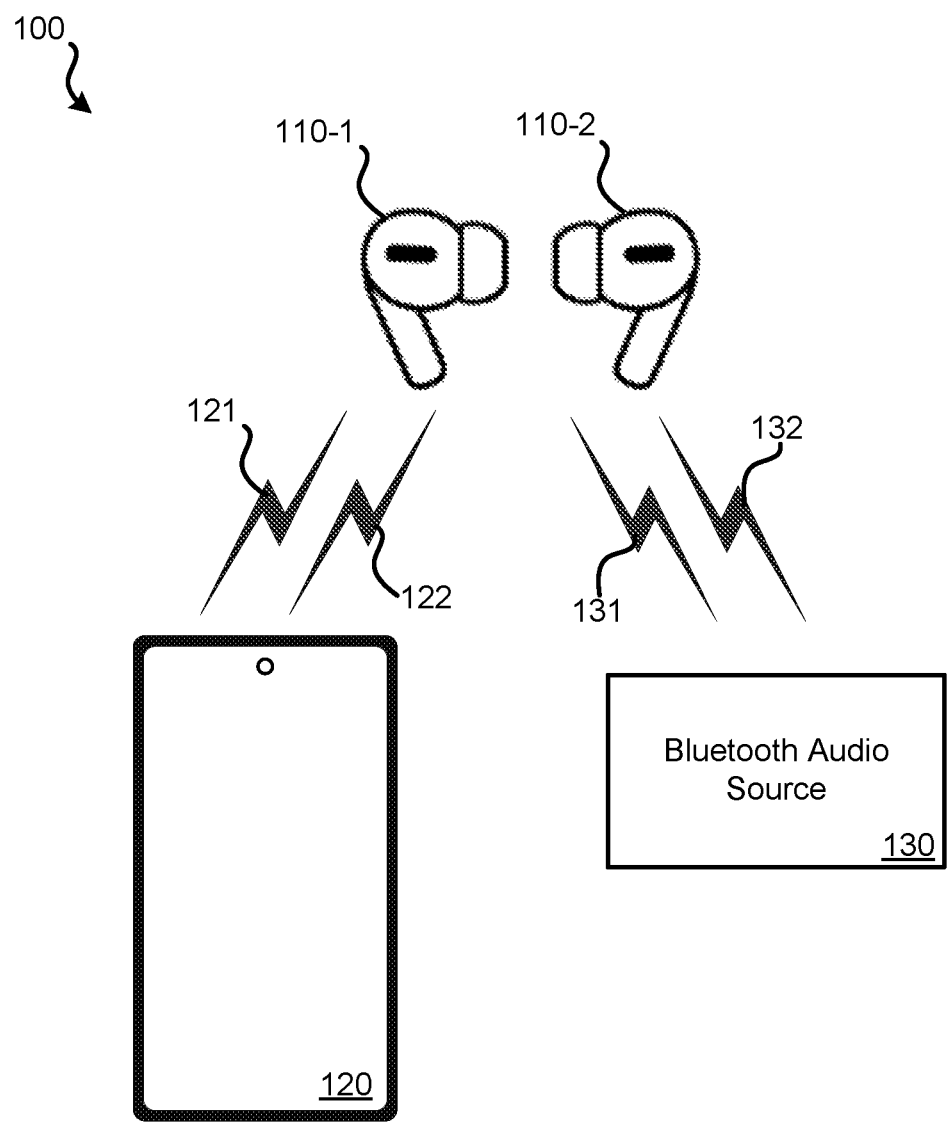
FIG. 1 illustrates an embodiment of an audio system that includes a pair of true wireless earbuds serving as an audio device for multiple audio sources.

FIG. 1 illustrates an embodiment of an audio system 100 including a pair of true wireless earbuds serving as an audio device for multiple wireless audio sources. Audio system 100 can include: earbuds 110 (which include earbud 110-1 and earbud 110-2); audio source 120; and audio source 130.

"True wireless earbuds" refer to earbuds that both: 1) receive audio wirelessly from one or more audio sources; and 2) are not physically connected with each other, such as via a wire. Therefore, in a pair of true wireless earbuds, each earbud must have its own power supply and wireless communication interface to allow for communication. As detailed herein, embodiments of earbuds, unless otherwise noted, are directed to true wireless earbuds, such as earbuds 110.

Audio source 120 can represent various forms of computerized devices capable of outputting Bluetooth communications. As illustrated, one possible form of audio source 120 is a smartphone. For example, a smartphone can output stereo audio (e.g., music, gaming audio, audio for an audio or video conference) and mono audio (e.g., audio for a telephone call, mono audio for an audio or video conference). Many other forms of audio source 120 may be possible, such as: a tablet computer, a gaming device, a laptop computer, a desktop computer, a stereo system, and a television. More generally, any computerized device that outputs Bluetooth audio can serve as audio source 120. Audio source 120, when used for voice phone calls, can alternatively be referred to as a call gateway (CG). As used within this document, audio source 120 can alternatively be used as and referred to as a CG. (In voice call terminology, earbuds 110 can be referred to as a "call terminal.")

While one or more active communication channels are present between audio source 120 and earbuds 110, separate one or more active communication channels can be present between earbuds 110 and at least one additional audio source. As illustrated, another Bluetooth audio source, audio source 130, is present. Again here many other audio sources may be possible, such as: a tablet computer, a gaming device, a laptop computer, a desktop computer, a computerized music device, a stereo system, or a television, or any computerized device that outputs Bluetooth audio can serve as audio source 130.

Various use cases exist where it can be beneficial to a user for earbuds 110 to have communication channels with multiple audio sources. For example, earbuds 110 may receive audio from a computer (e.g., as audio source 120) for a video conference, but the user may desire to allow his smartphone (e.g., as audio source 130) to output notifications that are played instead of or over the audio for the video conference. As another example, a user may be listening to music via their smartphone (e.g., as audio source 120), while listening to the music, the user may be in a public place that outputs auditory notifications via Bluetooth, such as flight notifications at an airport. A computerized system of the airport may function as audio source 130 which causes flight notifications to be output instead of or over the audio being streamed to earbuds 110 by audio source 120.

Notably, audio source 130 may not be present in many embodiments or may only be intermittently present. Referring to the previous example, after leaving the airport (or perhaps disabling notifications) earbuds 110 may only receive audio from audio source 120. Other similar examples exist. For example, referring to the first example, after conclusion of the video conference, earbuds 110 may only receive audio (e.g., the auditory notifications) from their smartphone. While the example of FIG. 1 illustrates two audio sources, it may be possible for earbuds 110 to receive audio from more than two audio sources. Earbuds 110 may be configured to prioritize and/or mix audio received concurrently from different audio sources.

In general, Bluetooth-family protocols are used as the short-range wireless technology standards for exchanging data between audio source 120 (and possibly audio source 130) and earbuds 110. Within the Bluetooth-family, various versions of Bluetooth may be used, depending on the particular embodiment. Bluetooth Basic Rate/Enhanced Data Rate (Bluetooth BR/EDR), which is also referred to as Bluetooth "Classic," can be used in various embodiments as detailed herein. Some embodiments detailed herein rely on Bluetooth Low Energy (LE) or LE Audio as the specific Bluetooth-family protocol for communication. The same hardware may be used to implement any of these Bluetooth-family protocols.

Further, embodiments detailed herein may use one or more of these Bluetooth-family protocols as a starting point, but may have additional features that go beyond the specification of the standard. These additional features require both an audio source and earbuds that are compatible with the additional features to be used in order for the additional features to be available. As an example, one manufacturer may produce earbuds and audio sources (e.g., smartphones, laptop computers, tablet computers) that support additional features that go beyond the minimum features of a Bluetooth-family protocol when used together. However, when one of such devices is used with another manufacturer's devices, such additional features beyond the Bluetooth-family may not be available unless the manufacturers have cooperated on implementing the additional features.

While the embodiments detailed herein are focused on improvements to Bluetooth-family protocols, it should be understood that the embodiments detailed herein can also be applied to other short-range communication protocols that could be used between audio devices and audio sources.

As illustrated, for Bluetooth LE or LE Audio, separate data streams may be used between an audio source and each earbud of earbuds 110. A connected isochronous stream (CIS) may be present on link 121 from audio source 120 to earbud 110-1. A separate CIS may be present as part of link 122 to earbud 110-2. If audio is being transmitted from an earbud of earbuds 110 to audio source 120 (e.g., from a microphone of an earbud for a phone call), another CIS may be present from an earbud to audio source 120. Alternatively, the same CIS can be used for transmitting microphone audio from an earbud to audio source 120. Separate CISs may also exist as part of wireless communications 131 and wireless communications 132 between audio source 130 and earbuds 110. Separately, between each audio source and each earbud, can be another channel, referred to as an asynchronous connection-oriented link (ACL) that allows for control data to be transmitted between the audio source and the particular earbud in both directions.

For mono audio (e.g., a phone call, videoconference), the audio transmitted to each earbud of earbuds 110 from an audio source, such as audio source 120, may be the same. For stereo audio (e.g., music playback, gaming), the audio transmitted to each earbud of earbuds 110 differs.

Figure 2:
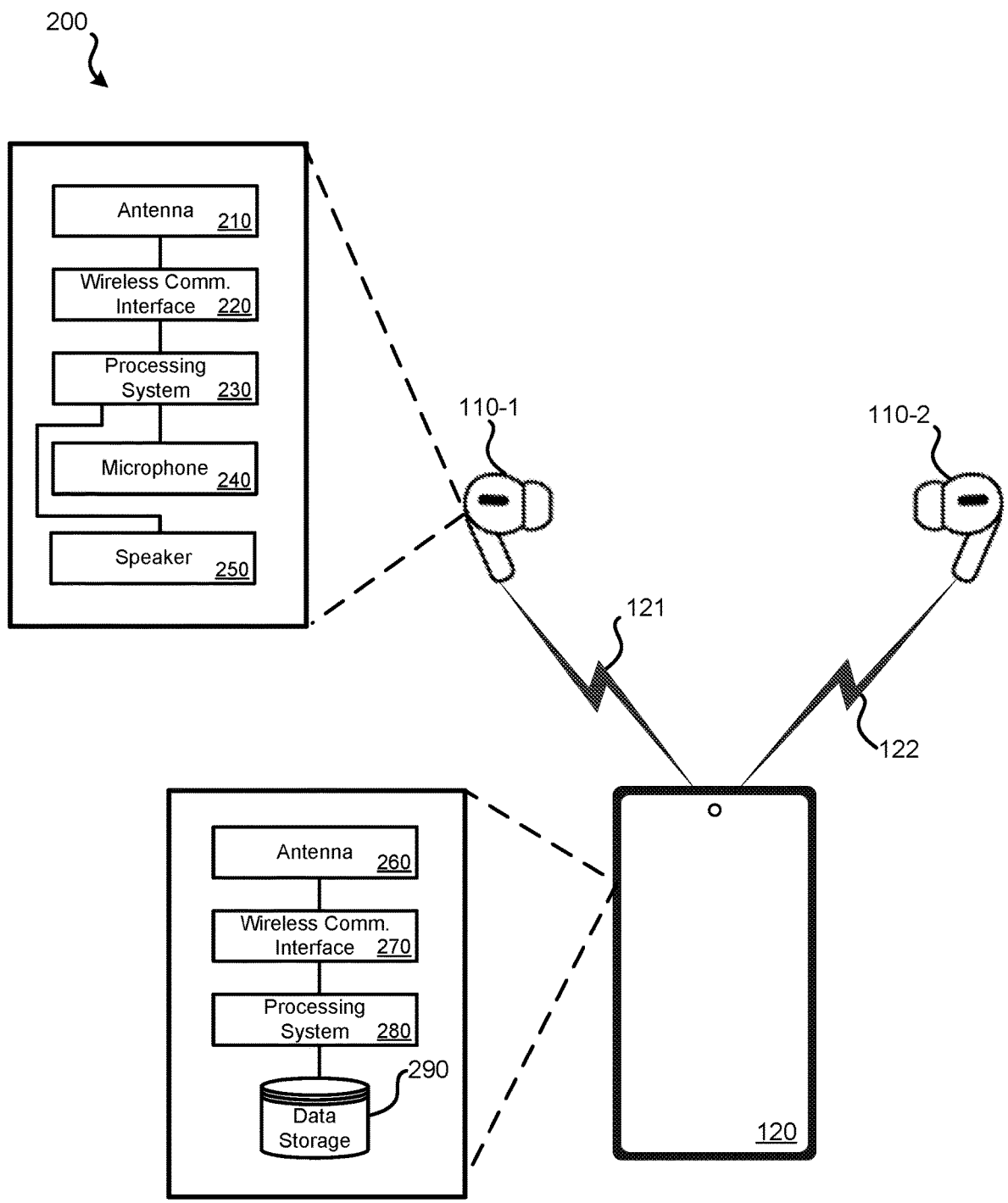
FIG. 2 illustrates an embodiment of a block diagram of an audio system that includes a pair of true wireless earbuds communicating with an audio source.

FIG. 2 illustrates an embodiment of a block diagram of an audio system 200 that includes a pair of true wireless earbuds communicating with an audio source. Audio system 200 can represent an embodiment of audio system 100 in which only a single audio source is present. Audio system 200 can include earbuds 110 and audio source 120.

Referring to earbuds 110, components of earbud 110-1 can include: antenna 210; wireless communication interface 220; processing system 230; microphone 240; and speaker 250. Earbud 110-2 may have the same components. Antenna 210 can be used for receiving and transmitting Bluetooth-family communications, including BR/EDR, and LE (including LE Audio which uses LE). Wireless communication interface 220 can be implemented as a system on a chip (SOC). Wireless communication interface 220 can include a Bluetooth radio and componentry necessary to convert raw incoming data (e.g., audio data, other data) to Bluetooth packets for transmission via antenna 210. Wireless communication interface 220 may also include componentry to enable one or more alternative or additional forms of wireless communication, both with an audio source and between earbuds. Processing system 230 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored locally using one or more non-transitory processor-readable mediums, such as random access memory (RAM), and/or flash memory. In some embodiments, processing system 230 and wireless communication interface 220 may be part of a same circuit or SOC.

In some earbuds, microphone 240 may be present. In some embodiments, each of earbuds 110 has a microphone. In other embodiments, only one of earbuds 110 has a microphone. In still other embodiments, no microphone may be present in either of earbuds 110. Audio captured using the one or more microphones of earbuds 110 can be transmitted to audio source 120. This audio, which can be referred to as "upstream" audio, may include voice, such as for use in a telephone call, video conference, gaming, etc. Various componentry (not illustrated) may be present between wireless communication interface 220, processing system 230, and microphone 240, such as an analog to digital converter (ADC) and an amplifier.

Speaker 250 converts received analog signals to audio. Various componentry (not illustrated) may be present between wireless communication interface 220, processing system 230, and speaker 250, such as a digital to analog converter (DAC) and an amplifier.

Various components of earbud 110-1 are not illustrated. In addition to the ADC, DAC, and amplifiers previously mentioned, earbud 110-1 also includes a power storage component, such as one or more batteries, and associated componentry to allow for recharging of the power storage component. Also present is a housing and componentry to hold earbud 110-1 within a user's ear. One or more non-transitory processor readable mediums can be understood as present and accessible by wireless communication interface 220, processing system 230, or both. For instance, such mediums may be used for temporary storage of data (e.g., buffers) and storing data necessary for Bluetooth communication (e.g., encryption keys).

Audio source 120 can include: antenna 260; wireless communication interface 270; processing system 280; and data storage 290. Antenna 260 can be used for receiving and transmitting Bluetooth-family communications, including BR/EDR, and LE. Wireless communication interface 270 can be implemented as a system on a chip (SOC). Wireless communication interface 270 can include a Bluetooth radio and componentry necessary to convert raw incoming data (e.g., audio data, other data) to Bluetooth packets for transmission via antenna 260. Wireless communication interface 270 can additionally or alternatively be used for one or more other forms of wireless communications. Processing system 280 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored locally using one or more non-transitory processor-readable mediums via data storage 290, which can include random access memory (RAM), flash memory, a hard disk drive (HDD) and/or a solid-state drive (SSD). In some embodiments, processing system 280 and wireless communication interface 270 may be part of a same circuit or SOC.

Audio source 120 can include various other components. For example, if audio source 120 is a smartphone, various components such as: one or more cameras, a display screen or touch screen, volume control buttons, or other wireless communication interfaces can be present.

Figure 3:
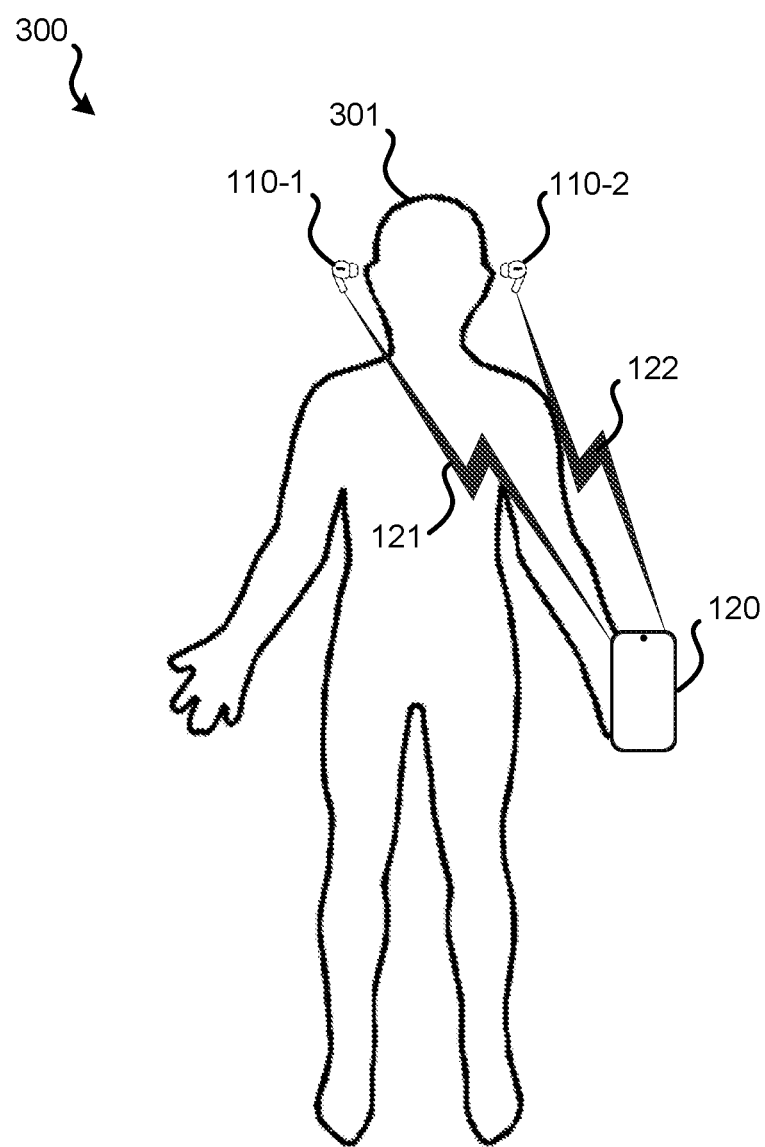
FIG. 3 illustrates an embodiment of cross-body attenuation resulting in communication between an audio source (or call gateway) and a first earbud experiencing more attenuation than communication between the audio source and the second earbud.

FIG. 3 illustrates an embodiment 300 of cross-body attenuation resulting in communication between an audio source and a first earbud experiencing more attenuation (or path loss) than communication between the audio source and the second earbud. In embodiment 300, user 301 is holding audio source 120 in their left hand (that is, as illustrated, user 301 is facing out of the page). Bluetooth communications occur between audio source 120 and earbud 110-2 as indicated by link 122; Bluetooth communications between audio source 120 and earbud 110-1 as indicated by link 121.

Due to audio source 120 being in the user's left hand, link 121 with earbud 110-1, which is in the user's right ear, results in wireless signals travelling through more of the user's body than link 122. Therefore, more attenuation occurs in link 121 than link 122. Accordingly, it is more likely that Bluetooth data packets exchanged between earbud 110-1 and audio source 120 may be not properly received than Bluetooth data packets exchanged between earbud 110-2 and audio source 120.

Which earbud experiences more attenuation and/or interference in its communications with an audio source can vary based on the location of audio source 120. Common places where user 301 may keep audio source 120 are: in a left hand; in a right hand; in a front left or right pocket, in a rear left or right pocket; on an arm band; in a left or right chest pocket; and on a surface or dock. Each of these locations can result in significantly different communication paths between each earbud and the antenna of the audio source and, thus, one earbud's communications can experience significantly higher interference or attenuation than the other earbud's communications.

Figure 4:
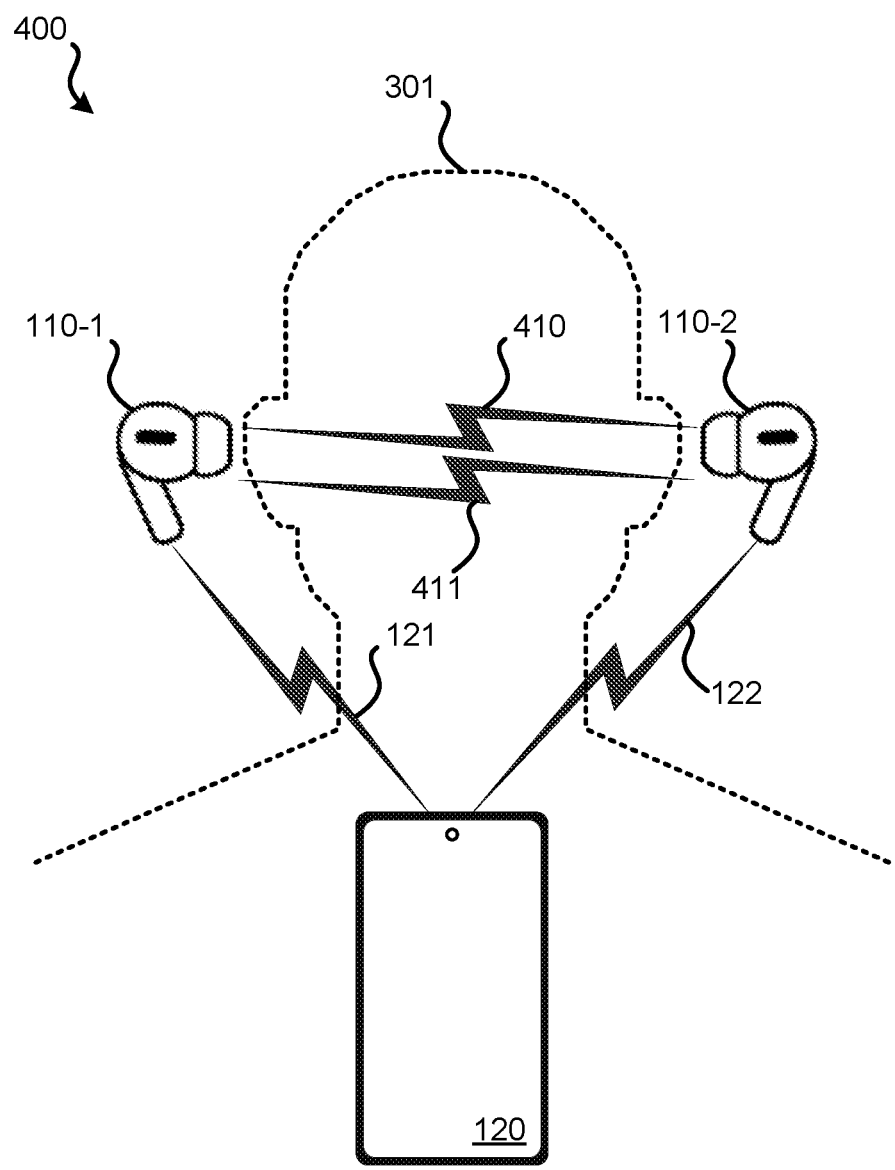
FIG. 4 illustrates an embodiment of an audio system in which true wireless earbuds communicate with each other in addition to communicating with an audio source.

FIG. 4 illustrates an embodiment of an audio system 400 in which true wireless earbuds communicate with each other in addition to communicating with an audio source. Earbud 110-1 can perform wireless communications using cross-link 410 with earbud 110-2 and, similarly, earbud 110-2 can perform wireless communications using cross-link 411 with earbud 110-1 in some embodiments. This communication can occur via a proprietary link specific to earbuds 110 and therefore can be outside of any Bluetooth family protocol specification. The path between earbuds 110, when in use by user 301, is predictable because the distance and the object through which the signals pass (the head of user 301) remain constant. As detailed herein, the ability of earbuds 110 to communicate with each other can have significant advantages.

Cross-links 410 and 411 can use LE 2M, LE HDT (pending standardization), LE proprietary high data rate modes, classic BR/EDR, or some proprietary communication scheme. Therefore, while Bluetooth-compliant wireless communications occur between earbuds 110 and audio source 120, communications directly between earbuds do not necessarily need to be compliant with Bluetooth or any other particular communication protocol.

In some embodiments, communication between earbuds 110 can be a cross-acknowledgement, referred to as a CrossACK for short. As detailed herein, "cross-" communications refer to wireless communications transmitted directly from a first earbud and received by a second earbud. A CrossACK can allow one of earbuds 110 to notify the other earbud of earbuds 110 that a Bluetooth packet was properly received from a source device. A CrossACK and data packets between earbuds can be sent using the same radio used for Bluetooth communications. At a high level, when a packet addressed to only a first earbud is not properly received by the first earbud, but is properly received by the second earbud, the second earbud can transmit a CrossACK to the first earbud. The first earbud may then request the packet be relayed to the first earbud from the second earbud. This arrangement prevents the first earbud from having to request retransmission from the source device and/or can allow the first earbud to obtain the data from the second earbud if transmissions from the audio source continue to fail.

While a CrossACK is one form of communication that can occur between earbuds 110, other communications detailed herein between earbuds may not involve a CrossACK being transmitted.

Figure 5A:
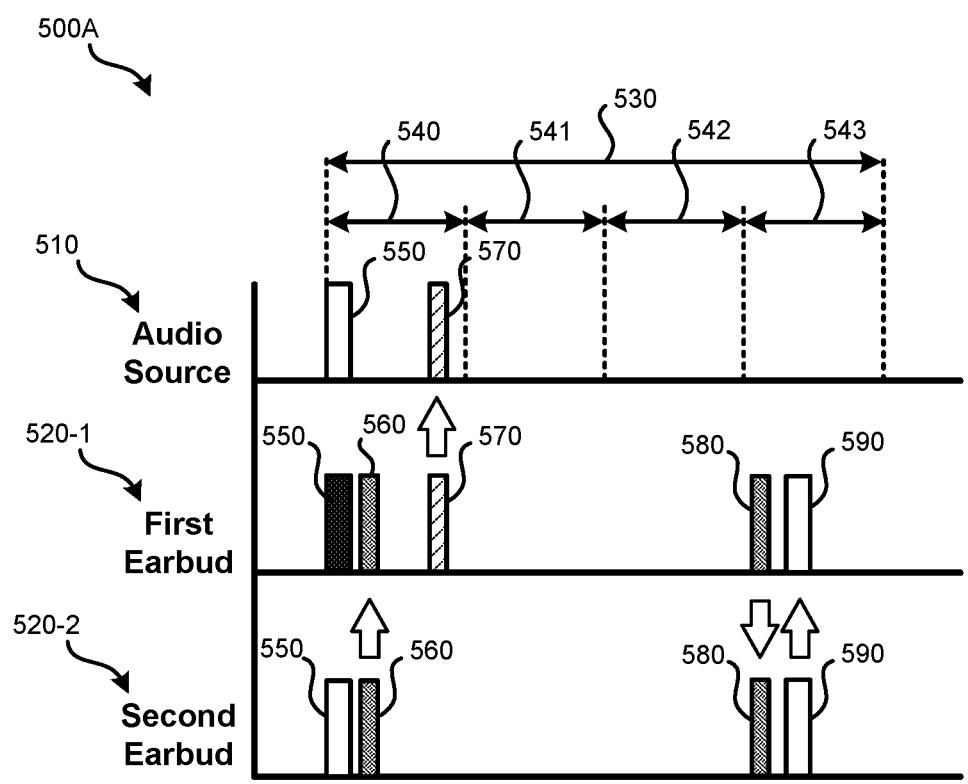
FIG. 5A illustrates an embodiment of communication between an audio source and true wireless earbuds in which the earbuds relay received data between themselves.
Figure 5B:
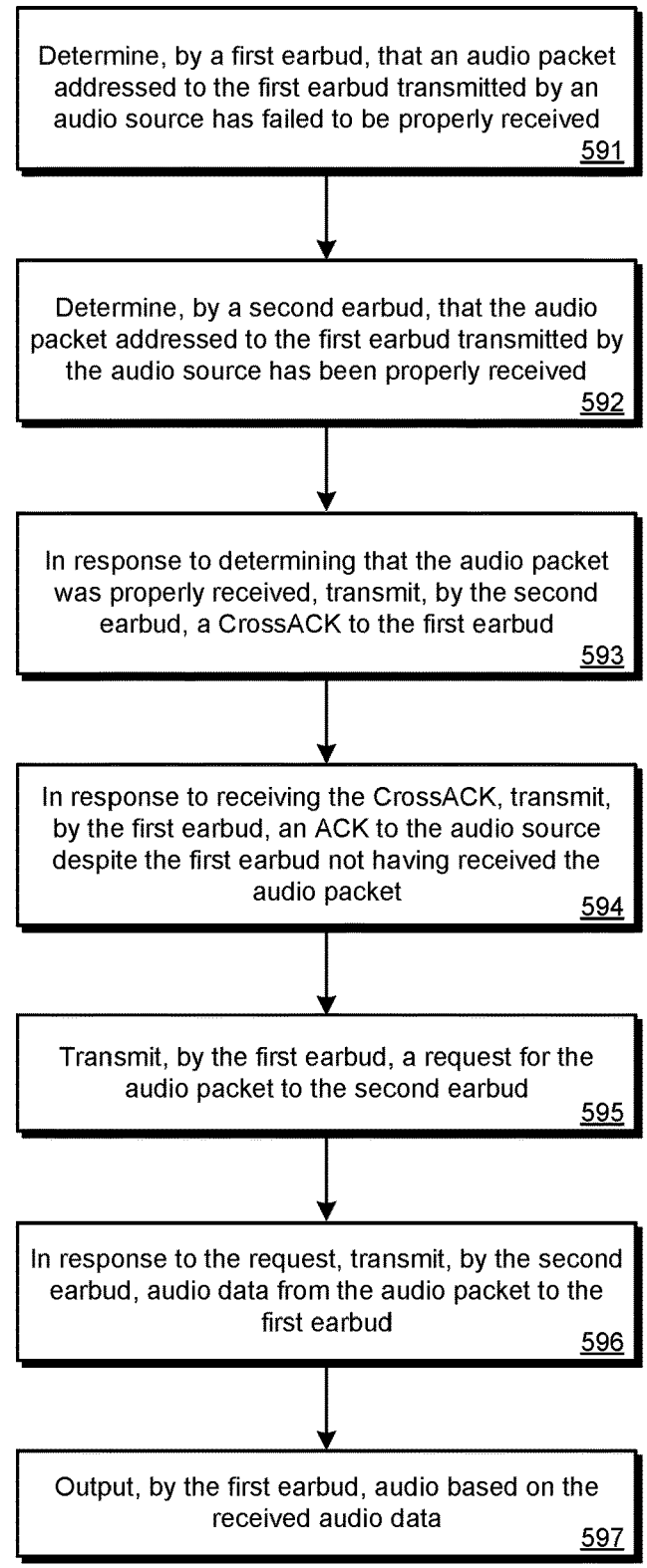
FIG. 5B illustrates an embodiment of a method corresponding to the embodiment of FIG. 5A.
Figure 6A:
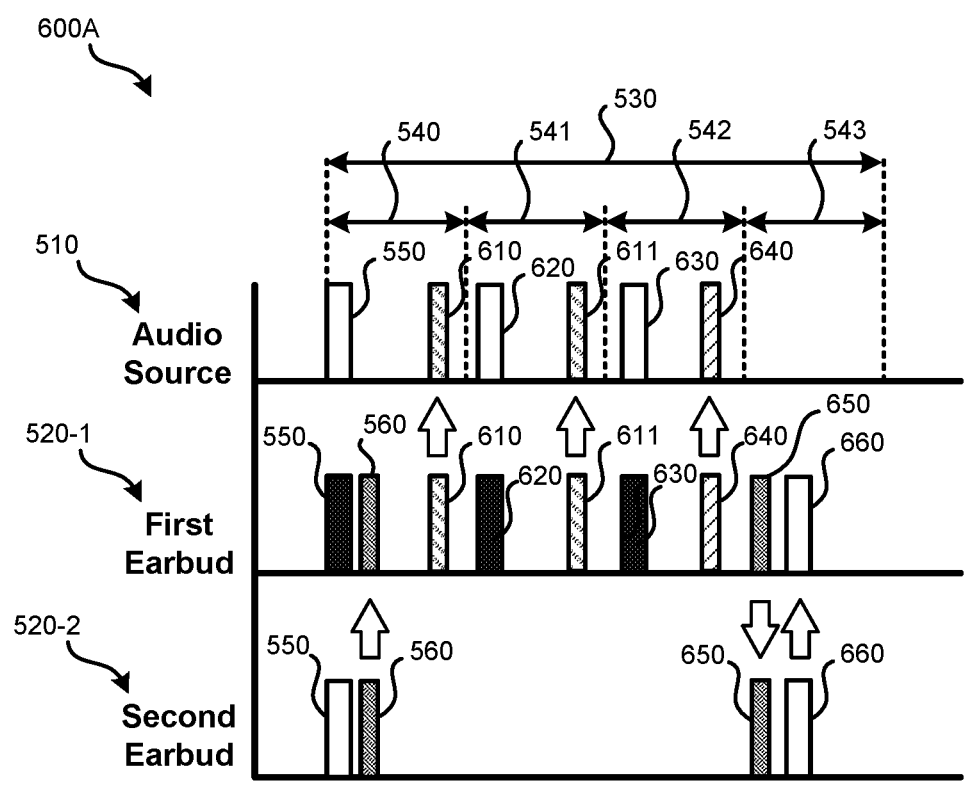
FIG. 6A illustrates another embodiment of communication between an audio source and true wireless earbuds in which the earbuds relay received data between themselves.

FIGS. 5A and 6A detail different embodiments in which a cross acknowledgement is used between earbuds. FIG. 5A illustrates an embodiment 500A of the timing and arrangement of communications between an audio source and true wireless earbuds in which the earbuds relay received data between themselves. FIG. 5B represents an embodiment of a method 500B corresponding to embodiment 500A. In embodiment 500A, first earbud 520-1 can represent either earbud 110-1 (a right earbud) or earbud 110-2 (a left earbud); earbud 520-2 represents the other earbud. Audio source 510 can represent an audio source, such as audio source 120, which can be a smartphone, tablet computer, laptop computer, or some other source of Bluetooth LE audio transmissions. In other embodiments, another short-range wireless communication protocol other than Bluetooth LE audio may be used.

In versions of embodiment 500A, while use of a cross acknowledgement may be outside the specification of any Bluetooth family communication protocol (including LE Audio), the remainder of communications may be performed in accordance with the Bluetooth protocol. As such, since communications outside of the Bluetooth protocol occur only between earbuds, audio source 510 does not need to be aware that earbuds 520 are performing communications outside the scope of a Bluetooth protocol.

In FIG. 5A, Connected Isochronous Stream (CIS) 530 includes a number of subevents (in this example, four) during which Bluetooth packets can be transmitted from audio source 510 to an earbud. In this example, CIS event 530 corresponds to transmission of a Bluetooth packet from audio source 510 to earbud 520-1. Following CIS event 530 would be a second CIS that corresponds to transmission of another Bluetooth packet from audio source 510 to earbud 520-2. Together, these two CISs make a single Connected Isochronous Group (CIG) event.

During subevent 540, audio source 510 transmits audio packet 550, which is addressed to only first earbud 520-1, to first earbud 520-1. Audio packet 550 is not successfully received by earbud 520-1 at block 591. The reason for this could vary. For instance, cross-body attenuation as detailed in relation to FIG. 3 could be a cause of the unsuccessful reception. Another possible source of interference is WiFi communications using the same frequency band. While first earbud 520-1 did not successfully receive audio packet 550, second earbud 520-2 does successfully receive audio packet 550 at block 592. This reception can be referred to as "sniffing" since audio packet 550 is addressed to first earbud 520-1, but not second earbud 520-2. Earbuds 520 may have required information from each other to successfully receive the packets addressed exclusively for the other earbud on a CIS meant for the other earbud (e.g. CIS timing information, CIS properties like physical layer used, encryption keys, etc.), thus allowing sniffed packets addressed to the other earbud to be decrypted. Audio packet 550 can then be decrypted by earbud 520-2.

Within the same CIS subevent (CIS subevent 540), CrossACK 560 can be sent from earbud 520-2 to earbud 520-1 at block 593. CrossACK 560 indicates to earbud 520 that audio packet 550, which was transmitted during the same CIS subevent 540, was successfully received by second earbud 550-2. The timing of the transmission of CrossACK 560 is such that it is sent after second earbud 520-2 determines that audio packet 550 was properly received but before first earbud 520-1 is to respond to audio source 510 with either an acknowledgement ("ACK") or negative acknowledgement ("NAK").

Within subevent 540, audio source 510 is expecting to receive either an ACK or NAK from first earbud 520-1. An ACK indicates that audio packet 550 was successfully received by earbud 520-1. A NAK indicates that audio packet 550 was not successfully received by earbud 520-1. If no response is received by audio source 510, the lack of response can be interpreted as a NAK.

Despite earbud 520-1 not successfully receiving audio packet 550, because earbud 520-1 received CrossACK 560 from earbud 520-2, earbud 520-1 sends ACK 570 at block 594. Therefore, based on ACK 570, audio source 510 treats audio packet 550 as having been successfully received by earbud 520-1 and does not perform any retransmissions. (If neither earbuds 520 successfully received audio packet 550, a retransmission of audio packet 550 may occur during the next subevent, in this case subevent 541.)

In embodiment 500, no retransmission occurs in subevent 541 or subevent 542. Subevent 542, however, has been reserved. Therefore, subevent 542 is not available to audio source 510 for retransmissions. Audio source 510 may not need to be programmed or otherwise configured to reserve subevent 543. Rather, earbuds 520 may always send an ACK by subevent 542 at least if reservation of subevent 543 is needed for that particular CIS event 530.

During subevent 543, because audio packet 550 was not properly received by earbud 520-1 and because earbud 520-1 received CrossACK 560 from earbud 520-2, earbud 520-1 sends request 580 to earbud 520-2 at block 595. Request 580 may be a null or empty packet. This packet can be interpreted by earbud 520-2 as a request for audio packet 550, which was received within the same CIS event 530.

Request 580 and audio packet 590 can be transmitted as part of a separate cross-communication link between earbuds 520. For example, an ACL link between earbuds 520 can be used for these communications instead of a CIS link. Therefore, while the communications may occur during the time period when subevent 543 occurs, the communication link used may not be defined using a CIS event timing scheme.

In response to request 580, earbud 520-2 sends audio packet 590 at block 596. Audio packet 590 can include the same audio data as audio packet 550, but may be re-encrypted by earbud 520-2 and use a different access address (a different access address is used since the link being used is different: from earbud 520-2 to earbud 520-1 in contrast to from audio source 510 to earbud 520-1). Therefore, while the audio content data is the same in audio packet 590 and audio packet 550, other data can vary. In other embodiments, audio packet 590 can be the same as audio packet 550 (that is, not decrypted and re-encrypted). Following packet 590 being received by earbud 520-1 within subevent 543, earbud 520-1 has now received the audio data included in audio packet 550 and can then output audio via its onboard speaker based on the audio data at block 597.

The arrangement of FIG. 5A and the method of FIG. 5B can also be repeated in the opposite direction: if second earbud 520-2 fails to receive an audio packet addressed to second earbud 520-2 and if first earbud 520-1 did receive the audio packet, the data within the audio packet can be forwarded from first earbud 520-1 to second earbud 520-2.

In a variation of embodiment 500A, instead of only the final subevent 543 being reserved, the final two (or more) subevents can be reserved. By having an additional subevent reserved, this may allow for audio packet 590 to be sent multiple times to increase the chance that earbud 520-1 successfully receives from earbud 520-2. However, increasing the number of reserved subevents for earbud-to-earbud communications decreases the number of subevents available for retries by audio source 510. As previously noted, audio source 510 does not need to be programmed or otherwise configured to reserve subevent 542 and subevent 543. Rather, an earbud of earbuds 520 may always send an ACK by subevent 541 such that audio source 510 will not attempt a retransmission of the audio data in either subevent 542 or subevent 543.

In LE Audio, a mandatory duration, referred to as inter frame space (T_IFS), is present between when a packet is received (e.g., audio packet 550) and when a response (ACK, NAK), such as ACK 570, is to be sent. In LE Audio, T_IFS is 150 us. Therefore, CrossACK 560 must be sent within this 150 us window in order for CrossACK 560 to be received by earbud 520-1 prior to earbud 520-1 needing to transmit an ACK or NAK within the same subevent.

A CrossACK, such as CrossACK 560, may be sent at a data rate of 2 Mb/s or 4 Mb/s. A CrossACK can start with a preamble (e.g., 1 byte for 2 Mb/s or 2 bytes for 4 Mb/s) to help settle the automatic gain control (AGC) and frequency/timing loops. Next, within a CrossACK can be an access address (e.g., 4 bytes) and, possibly, an optional header (e.g., 2 bytes). The header may be protected by a forward-error correction code (FEC) and/or cyclic redundancy checks (CRC). In some embodiments of a CrossACK, two information bits within the header can be used (e.g., to identify the packet as a CrossACK). The remaining bits in the header (e.g., 14 bits) can be used for FEC coding and/or CRC. The FEC and/or CRC can be a standard code (e.g., Hamming, CRC, Gold, convolutional, etc.). The CrossACK can be 28 us (2 Mb/s) or 16 us (4 Mb/s) in duration.

Referring to FIG. 5A, in accordance with LE Audio, audio packet 550 may be 120 bytes and 540 us in duration. ACK 570 may be 44 us in duration. Within subevent 543, request 580 may be 44 us in duration, audio packet 590 may be 120 bytes and 540 us (in accordance with a standard LE audio packet). If an ACK or NAK is sent by earbud 520-1 to earbud 520-2, this response packet may be 44 us in duration. This timing can also apply to the arrangement of FIG. 6.

Figure 6B:
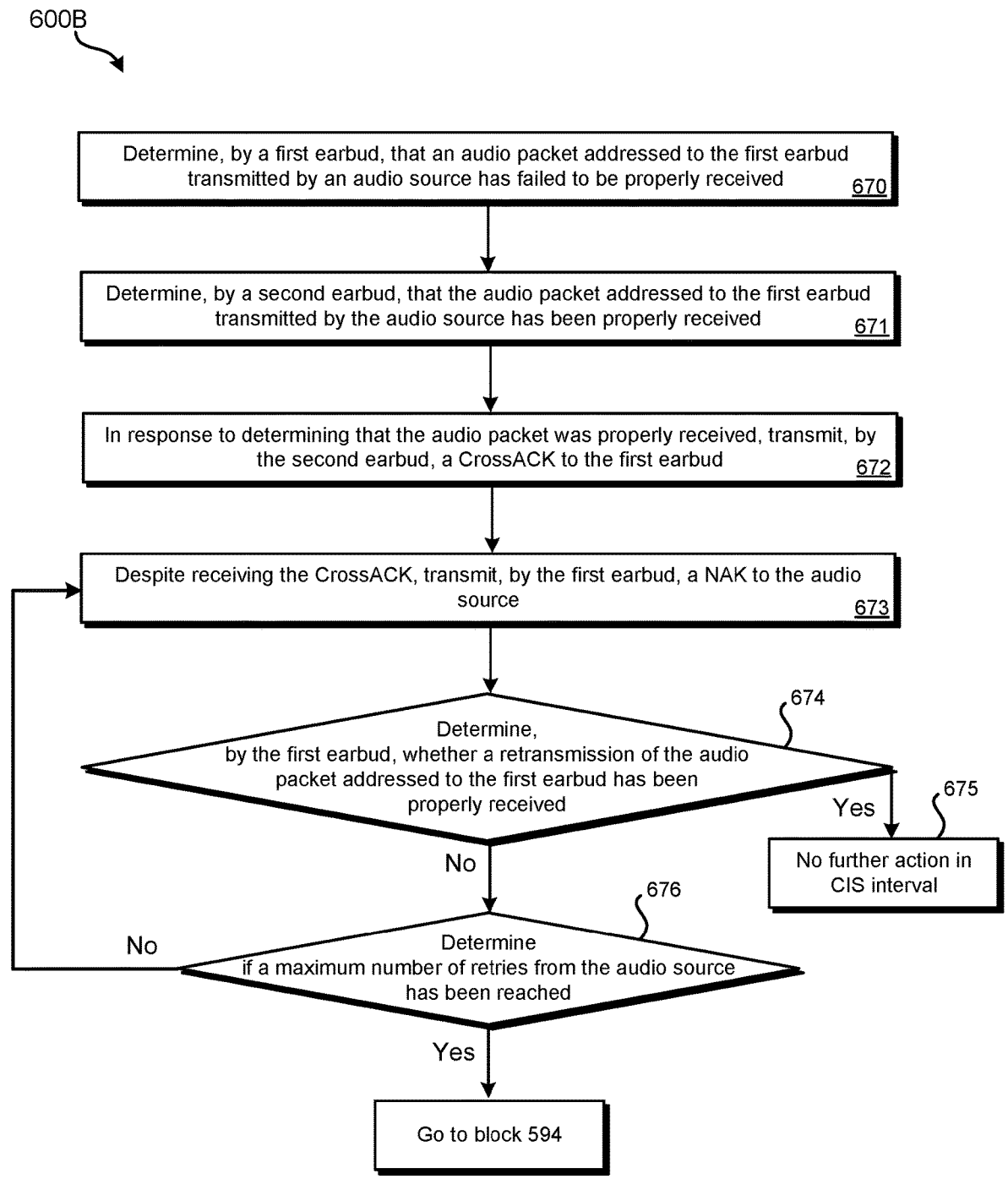
FIG. 6B illustrates an embodiment of a method corresponding to the embodiment of FIG. 6A.

In the arrangement of FIG. 5A, when audio packet 550 was not successfully received by earbud 520-1, but was received by earbud 520-2, earbud 520-1 responds to audio source 510 with an ACK. However, in the embodiment of FIG. 6, earbud 520-1 does not immediately rely on earbud 520-2 for the audio; rather earbud 520-1 transmits up to a defined number of NAKs before requesting the audio be sent by earbud 520-2. FIG. 6A illustrates embodiment 600A of communication between an audio source and true wireless earbuds in which the earbuds relay received data between themselves. FIG. 6B represents an embodiment of a method 600B corresponding to embodiment 600A.

In embodiment 600A, as in embodiment 500A, first earbud 520-1 can represent either earbud 110-1 (a right earbud) or earbud 110-2 (a left earbud); earbud 520-2 represents the other earbud. Audio source 510 can represent an audio source, such as audio source 120, which can be a smartphone, tablet computer, laptop computer, or some other source of Bluetooth LE audio transmissions. In other embodiments, another short-range wireless communication protocol other than Bluetooth LE audio may be used.

In alternative versions of embodiment 600A, while use of a cross acknowledgement may be outside the specification of any Bluetooth family communication protocol (including LE Audio), the remainder of communications may be performed in accordance with the Bluetooth protocol. As such, since communications outside of the Bluetooth protocol occur only between earbuds, audio source 510 does not need to be aware that earbuds 520 are performing communications outside the scope of a Bluetooth protocol. In FIG. 6A, CIS event 530 and CIS subevents 540, 541, 542, and 543 (referred to as "subevents" for short) are as defined in relation to embodiment 500.

In embodiment 600A, during subevent 540, audio source 510 transmits audio packet 550, which is addressed to only first earbud 520-1, to first earbud 520-1. Audio packet 550 is not successfully received by earbud 520-1 at block 670. As previously detailed, the reasons for this can vary. While first earbud 520-1 did not successfully receive audio packet 550, second earbud 520-2 does successfully receive (or sniff) audio packet 550 at block 671. Earbuds 520 may have required information from each other to successfully receive the packets addressed exclusively for the other earbud on a CIS meant for the other earbud (e.g. CIS timing information, CIS properties like Physical layer used, encryption keys, etc.), thus allowing sniffed packets addressed to the other earbud to be decrypted. Audio packet 550 can then be decrypted by earbud 520-2.

Within the same CIS subevent (CIS subevent 540), CrossACK 560 can be sent from earbud 520-2 to earbud 520-1 at block 672. CrossACK 560 indicates to earbud 520 that audio packet 550, which was transmitted during the same CIS subevent 540, was successfully received by second earbud 550-2. The timing of the transmission of CrossACK 560 is such that it is sent after second earbud 520-2 determines that audio packet 550 was properly received but before first earbud 520-1 is to respond to audio source 510 with either an ACK or NAK.

Within subevent 540, audio source 510 is expecting to receive either an ACK or NAK from first earbud 520-1. Unlike in embodiment 500, despite receiving CrossACK 560, first earbud 520-1 sends NAK 610 to audio source 510 at block 673. In response to NAK 610, audio source 510 sends a retransmission of audio packet 550 as audio packet 620 during subevent 541. At block 674, first earbud 520-1 determines whether the transmission of audio packet 620 addressed to only first earbud 520-1 was properly received by first earbud 520-1. If properly received, method 600B proceeds to block 675 and no further action within the current CIS event may be needed other than the transmission of an ACK to the audio source by the first earbud. However, as illustrated in FIG. 6A, audio packet 620 fails to be received by first earbud 520-1 and method 600B can proceed to block 676. At block 676, a check may be performed by earbuds 520 to see if a maximum number of retries from the audio source has been reached. For instance, block 676 may be performed to ensure at least one CIS subevent is reserved for communication between earbuds.

In response to not properly receiving audio packet 620 and the maximum number of retries not having yet been reached, NAK 611 is transmitted to audio source 510 by first earbud 520-1 (and method 600B can return to block 673). Since earbud 520-2 has already sent CrossACK 560 within CIS event 530, a second CrossACK may not be sent. Alternatively, if second earbud 520-2 receives audio packet 620 successfully but audio packet 550 was not received successfully, a CrossACK would be sent during subevent 541 instead of subevent 542.

In response to NAK 611, audio source 510 sends a second retransmission of the audio data of audio packet 550 as audio packet 630 during subevent 542 addressed to only first earbud 520-1. As illustrated, audio packet 630 fails to be received by first earbud 520-1. (In a variation of embodiment 600, audio packet 620 may be successfully received by first earbud 520-1 and further communications, other than an ACK transmitted by first earbud 520-1, may be unnecessary within CIS event 530.)

In response to not properly receiving audio packet 630, since a defined maximum number of retries within CIS 530 has been reached at block 676, ACK 640 is transmitted by first earbud 520-1 to audio source 510 at block 594. The maximum amount of retries prior to an earbud transmitting an ACK (despite not having received the audio packet) can be defined such that subevent 543 remains reserved for earbud-to-earbud communications. For example, subevent 543 may only be reserved by earbuds 520 if a CrossACK has been transmitted indicating successful reception of the audio data within CIS event 530.

Based on ACK 640, audio source 510 treats audio packet 630 as having been successfully received by first earbud 520-1 and does not perform any further retransmissions. During subevent 543, because none of audio packets 550, 620, and 630 were properly received by first earbud 520-1 and because first earbud 520-1 received CrossACK 560 from earbud 520-2, first earbud 520-1 sends request 650 to second earbud 520-2 at block 595. Request 650 may be a null or empty packet. This packet can be interpreted by second earbud 520-2 as a request for the audio data of audio packet 550, which was received within the same CIS event 530.

In response to request 650, second earbud 520-2 sends audio packet 660 at block 596. Audio packet 660 includes the same audio data as audio packet 550 (and audio packets 620 and 630) but may be re-encrypted by second earbud 520-2. In other embodiments, audio packet 660 can be the same as audio packet 550 (that is, not decrypted and re-encrypted). Following packet 660 being received by first earbud 520-1 within subevent 543, first earbud 520-1 has now received the audio data included in audio packet 550 and can then output audio via its onboard speaker based on the audio data at block 597.

Request 650 and audio packet 660 can be transmitted as part of a separate cross-communication link between earbuds 520. For example, an ACL link between earbuds 520 can be used for these communications instead of a CIS link. Therefore, while the communications may occur during the time period when subevent 543 occurs, the communication link used may not be defined using a CIS event timing scheme.

The arrangement of FIG. 6A can also be repeated in the opposite direction: if second earbud 520-2 fails to receive an audio packet addressed to second earbud 520-2 and if first earbud 520-1 did receive the audio packet, the data within the audio packet can be forwarded from first earbud 520-1 to second earbud 520-2 if some number of retries by audio source 510 also fail.

The arrangements of FIGS. 5A, 5B, 6A, and 6B are not necessarily independent of each other. Depending on link quality (between each earbud and the audio source, between earbuds, or both) measured by the earbuds, the earbuds can select which arrangement to use. Link quality may be measured based on statistics maintained on whether an ACK or NAK is received on a given link. For example, statistics on link quality can be maintained on some or all of: a link from earbud 520-1 to audio source 510; link from earbud 520-2 to audio source 510; a link between earbud 520-1 and earbud 520-2; and a link between earbud 520-2 and earbud 520-1. As an example, if a link between the audio source and each earbud tends to be strong, the arrangements of FIGS. 6A and 6B may be used. As another example, if a link between audio source 510 and earbud 520-1 tends to be weak, the arrangements of FIGS. 5A and 5B may be used. Therefore, while a user is using earbuds 110, the earbuds may dynamically change whether the arrangements of FIGS. 5A and 5B or FIGS. 6A and 6B are used depending on link conditions.

The timing of the arrangements of FIGS. 6A and 6B may be as detailed in relation to FIG. 5A. As a variation of method 500B, instead of only the final subevent 543 being reserved, the final two (or more) subevents can be reserved for cross-earbud communication. By having at least an additional subevent reserved, this may allow for audio packet 660 to be sent multiple times to increase the chance that earbud 520-1 successfully receives from earbud 520-2. However, increasing the number of reserved subevents for earbud-to-earbud communications decreases the number of subevents available for retries by audio source 510. Therefore, for example, only a single NAK 610 may be sent, thus allowing for only a single retry during subevent 541 in an arrangement with two (of a total of four) subevents within CIS event 530. As previously noted, audio source 510 does not need to be programmed or otherwise configured to reserve subevent 542 and subevent 543. Rather, in such embodiments, an earbud of earbuds 520 may always send an ACK by subevent 541 such that audio source 510 will not attempt a retransmission of the audio data in either subevent 542 or subevent 543.

While the embodiments of FIGS. 4A-6B are focused on communication between earbuds 520 occurring during CIS event 530, in the embodiments of FIGS. 7A-8C, at least some of the communication between earbuds 520 occurs after CIS events for earbuds 520 (e.g., two CIS events, one for each earbud) within a CIG interval.

Figure 7A:
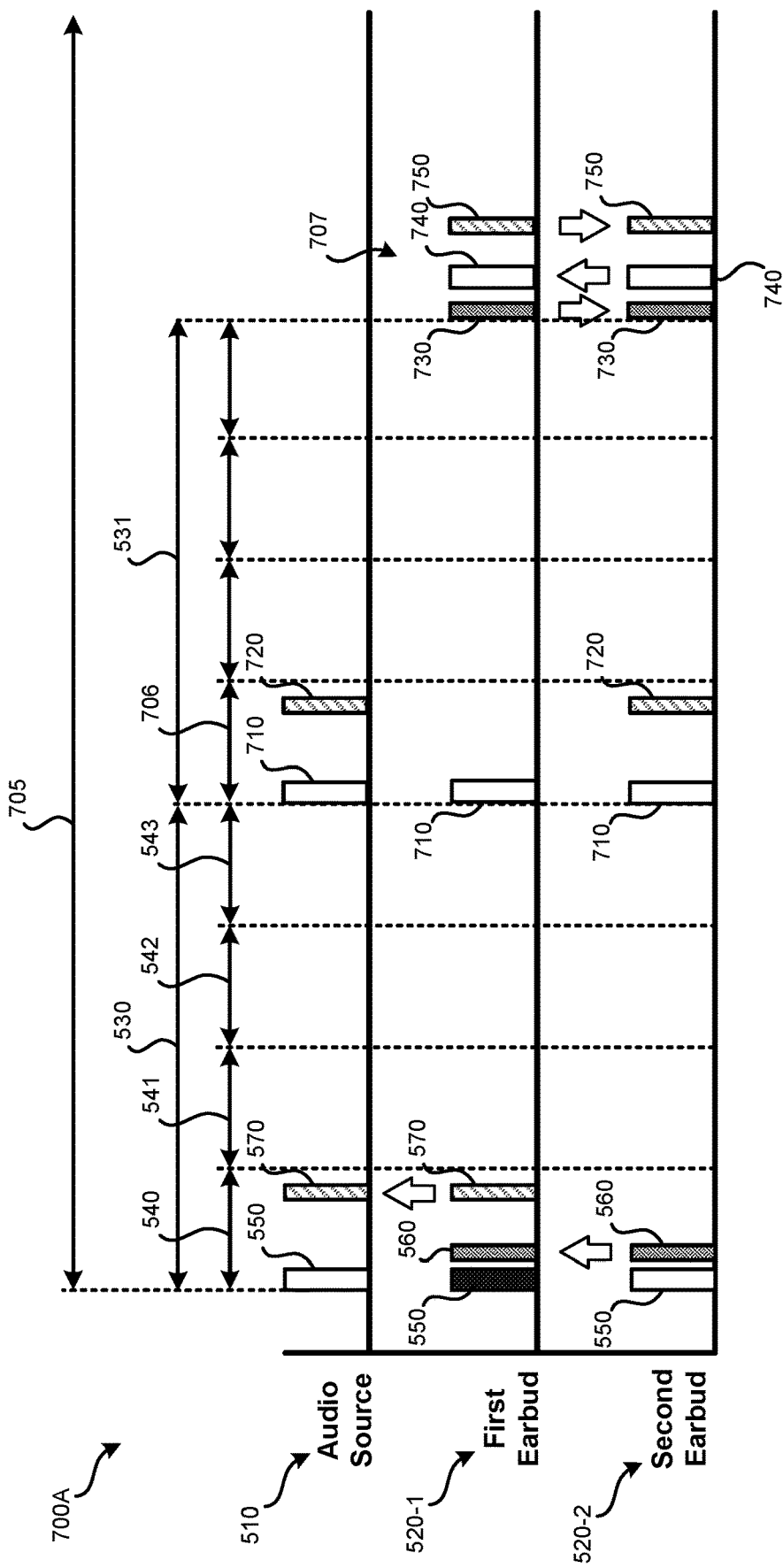
FIG. 7A illustrates an embodiment of communication between an audio source and true wireless earbuds in which the earbuds relay received data between themselves after CIS events within the CIG interval.

FIG. 7A illustrates an embodiment 700A of communication between an audio source and true wireless earbuds in which the earbuds relay received data between themselves after CIS events within CIG interval 705. In embodiment 700A, a CrossACK is used similarly to embodiment 500A. FIG. 7C represents an embodiment of a method 700C corresponding to embodiment 700A, which uses the systems, devices, and arrangements of FIGS. 1-4.

In embodiment 700A, first earbud 520-1 can represent either earbud 110-1 (a right earbud) or earbud 110-2 (a left earbud); earbud 520-2 represents the other earbud. Audio source 510 can represent an audio source, such as audio source 120, which can be a smartphone, tablet computer, laptop computer, or some other source of Bluetooth LE audio transmissions. In other embodiments, another short-range wireless communication protocol other than Bluetooth LE audio may be used.

CIS event 530 includes a number of subevents (in this example, four) during which Bluetooth packets can be transmitted from audio source 510 to an earbud. In this example, CIS event 530 corresponds to transmission of a Bluetooth packet from audio source 510 to earbud 520-1. Following CIS event 530 within CIG interval 705, either immediately or after some amount of time, is CIS event 531, which corresponds to transmission of a second Bluetooth packet from audio source 510 to earbud 520-2. These two CIS events are within CIG interval 705; however, additional communications can occur within CIG interval 705 outside of CIS event 530 and CIS event 531. As illustrated, CIS event 531 occurs immediately following CIS event 530. In some embodiments, time may elapse within CIG interval 705 between these CIS events.

During subevent 540, audio source 510 transmits audio packet 550, which is addressed to only first earbud 520-1, to first earbud 520-1. Audio packet 550 is not successfully received by earbud 520-1 at block 790. The reason for this could vary. For instance, cross-body attenuation as detailed in relation to FIG. 3 could be a cause of the unsuccessful reception. Another possible source of interference is WiFi communications (or some other wireless communication) using the same frequency band. While first earbud 520-1 did not successfully receive audio packet 550, second earbud 520-2 does successfully receive (sniff) audio packet 550 at block 791. Earbuds 520 may have required information from each other to successfully receive the packets addressed exclusively for the other earbud on a CIS meant for the other earbud (e.g. CIS timing information, CIS properties like Physical layer used, encryption keys, etc.), thus allowing sniffed packets addressed to the other earbud to be decrypted. Audio packet 550 can then be received and decrypted by earbud 520-2.

Within the timeframe of the same CIS subevent (CIS subevent 540), CrossACK 560 can be sent directly from earbud 520-2 to earbud 520-1 at block 792 (which can involve a different communication link being used, such as an ACL link between earbuds 520 or, as another example, a non-connected mode may be used). CrossACK 560 indicates to earbud 520-1 that audio packet 550, which was transmitted during the same CIS subevent 540, was successfully received by second earbud 550-2. The timing of the transmission of CrossACK 560 is such that it is sent after second earbud 520-2 determines that audio packet 550 was properly received but before first earbud 520-1 is to respond to audio source 510 with either an ACK or NAK.

Within subevent 540, audio source 510 is expecting to receive either an ACK or NAK from first earbud 520-1. Despite earbud 520-1 not successfully receiving audio packet 550, because earbud 520-1 received CrossACK 560 from earbud 520-2, earbud 520-1 sends ACK 570 at block 793. Therefore, based on ACK 570, audio source 510 treats audio packet 550 as having been successfully received by earbud 520-1 and does not perform any retransmissions (or any additional retransmissions). (If neither of earbuds 520 successfully received audio packet 550, a retransmission of audio packet 550 may occur during the next subevent, in this case subevent 541.)

In contrast to embodiment 500A, first earbud 520-1 does not request audio data from second earbud 520-2 within CIS event 530. Rather, either immediately or after a time within CIG interval 705, CIS event 531 occurs. CIS event 531 involves audio packet 710 being sent by audio source 510 addressed (only) to second earbud 520-2 during at least subevent 706. In embodiment 700A, audio packet 710 is properly received by second earbud 520-2 and is also sniffed by first earbud 520-1. (However, it should be noted that whether first earbud 520-1 does or does not successfully sniff audio packet 710 is inconsequential to the remainder of embodiment 700A since second earbud 520-2 properly received audio packet 710.)

Cross-communications 707 represents an exchange between earbuds 520 within CIG interval 705 after completion of CIS event 530 and CIS event 531. While cross-communications 707 is illustrated in embodiment 700A as occurring immediately following CIS event 531, some amount of time may be elapse between CIS event 531 and cross-communications 707. In some embodiments, a CIS link is used for communications between earbuds 520 but in other embodiments, an ACL link used instead. The cross-communications on a CIS link may be timed to be part of a subevent. However, on an ACL link, timing can be based on an established ACL interval. Regardless of the type of link used for cross-communications 707, earlier communications are not overlapped since only a single Bluetooth radio may be available for use. As part of cross-communications 707, earbud 520-1 sends request packet 730 (or "packet 730") to second earbud 520-2 at block 794. Request packet 730 may be a null or empty packet. Request packet 730, such as by virtue of being transmitted during CIG interval 705, is used to trigger second earbud 520-2 to transmit audio data corresponding to audio packet 550.

In response to request packet 730, earbud 520-2 sends audio packet 740 at block 795. Audio packet 740 can include the same audio data as audio packet 550, but may be re-encrypted by earbud 520-2 and use a different access address (a different access address is used since the link being used is different: from earbud 520-2 to earbud 520-1 in contrast to from audio source 510 to earbud 520-1). Therefore, while the audio content data is the same in audio packet 740 and audio packet 550, other data can vary. Further, as previously detailed, an ACL link can be used for cross-communications 707.

Additionally, in some embodiments, ACK 750 is transmitted from first earbud 520-1 to second earbud 520-2 at block 796. In response to ACK 750, second earbud 520-2 does not attempt any retransmissions of the audio data. However, if a NAK was received instead of ACK 750, second earbud 520-2 can attempt a retransmission during subevent 708. Transmission retries directly between earbuds can occur, such as based on the timing of the ACL link. Following packet 740 being received by earbud 520-1, earbud 520-1 has now received the audio data included in audio packet 550 and can then output audio via its onboard speaker based on the audio data at block 797.

In other embodiments, it may be possible that packet 730 was not properly received by earbud 520-2. In such a situation, instead of audio packet 740 being transmitted, to earbud 520-1, a NAK may be transmitted (e.g., on the ACL link). This NAK would trigger earbud 520-1 to resend the data of packet 730, and, when properly received by earbud 520-2, would result in audio packet 740 being transmitted, then followed by ACK 750.

Figure 7B:
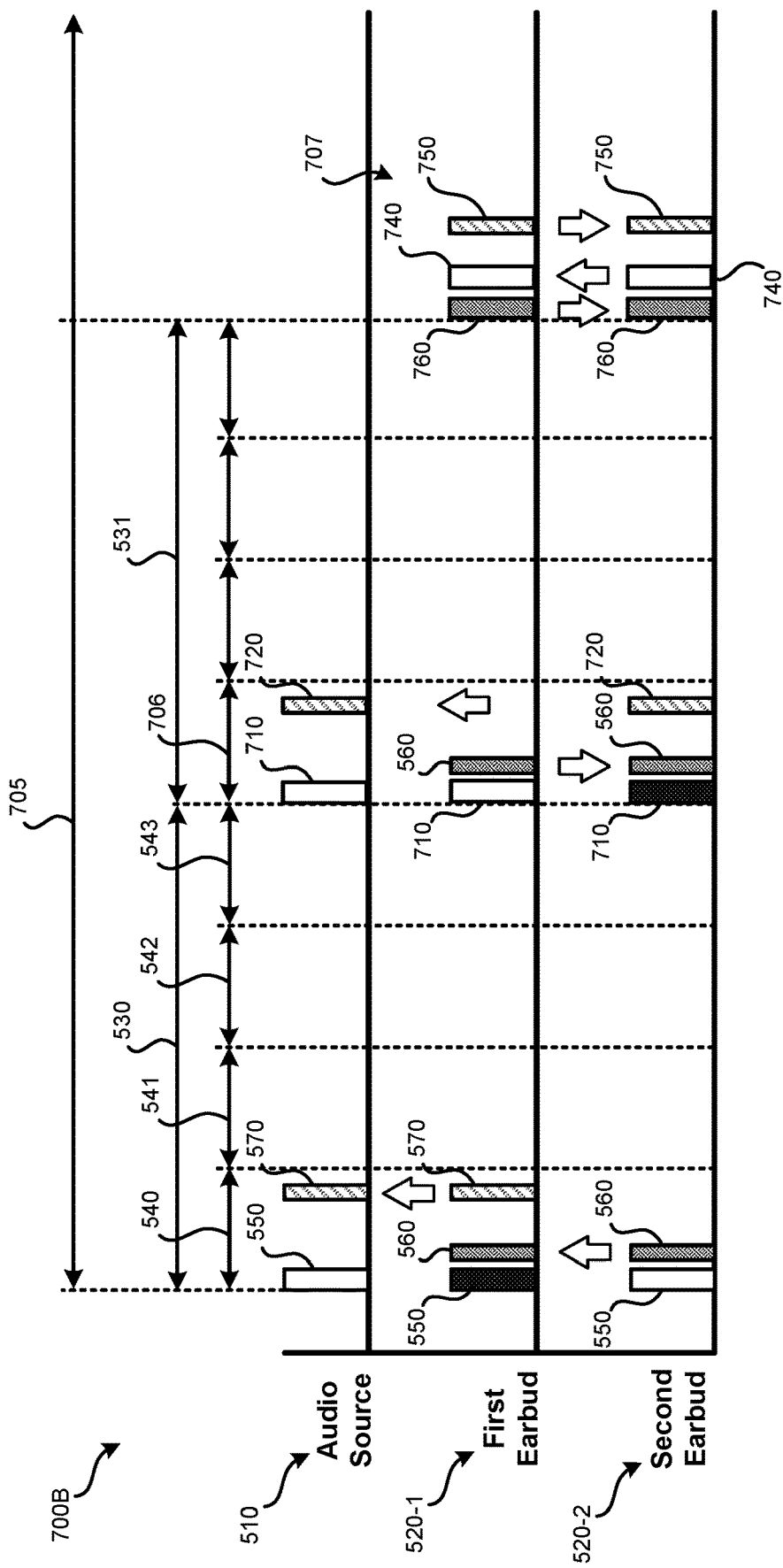
FIG. 7B illustrates another embodiment of communication between an audio source and true wireless earbuds in which the earbuds relay received data between themselves after CIS events within the CIG interval.
Figure 7C:
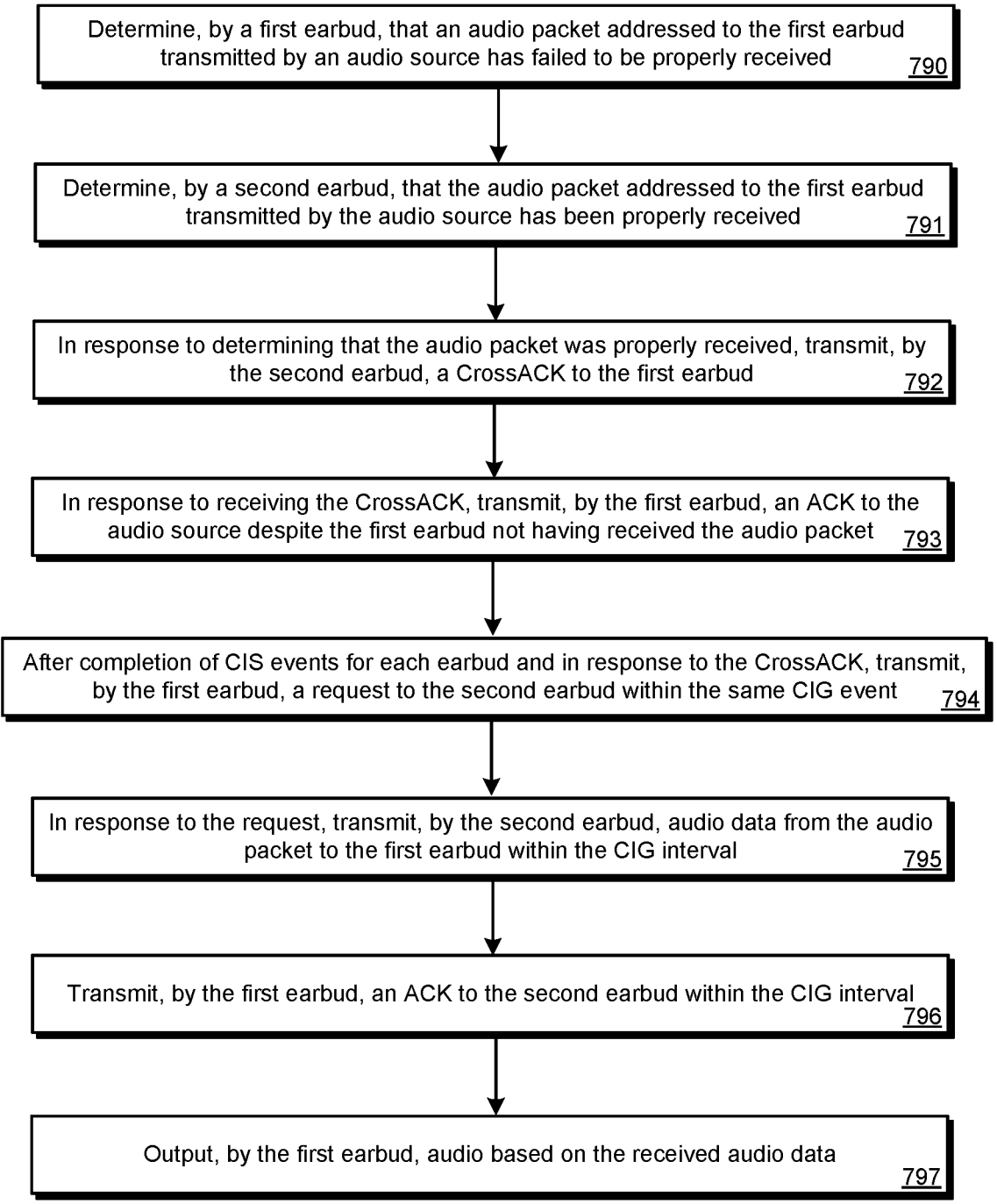
FIG. 7C illustrates an embodiment of a method corresponding to the embodiments of FIGS. 7A and 7B.

FIG. 7B illustrates an embodiment 700B of communication between an audio source and true wireless earbuds in which the earbuds relay received data between themselves after CIS events within the CIG interval. While in embodiment 700A a first earbud 520-1 did not successfully receive audio packet 550 from audio source 510, in embodiment 700B, second earbud 520-2, in addition, did not receive audio packet 710 from audio source 510. Method 700C can all correspond to FIG. 7B. Within CIG interval 705, communication within CIS event 530 can occur as detailed in relation to FIG. 7A.

In embodiment 700B, first earbud 520-1 can represent either earbud 110-1 (a right earbud) or earbud 110-2 (a left earbud); earbud 520-2 represents the other earbud. Audio source 510 can represent an audio source, such as audio source 120, which can be a smartphone, tablet computer, laptop computer, or some other source of Bluetooth LE audio transmissions. In other embodiments, another short-range wireless communication protocol other than Bluetooth LE audio may be used.

In contrast to embodiment 700A of FIG. 7A, in embodiment 700B, audio packet 710, transmitted from audio source 510 and addressed to only second earbud 520-2, has failed to be successfully received by second earbud 520-2 (which can be understood as block 790 being repeated by the second earbud, instead of the first). However, first earbud 510-1 does successfully receive audio packet 710 (which can be understood as block 791 being repeated by the first earbud, instead of the second). Within subevent 706, CrossACK 560 is sent to second earbud 520-2, which indicates that first earbud 520-1 has successfully received audio packet 710 and has stored the audio data from audio packet 710 (which can be understood as block 792 being performed by first earbud 520-1 instead of second earbud 520-2).

Despite earbud 520-2 not successfully receiving audio packet 710, because earbud 520-2 received CrossACK 560 from earbud 520-1, earbud 520-2 sends ACK 720 (which can be understood as block 793 being repeated by the second earbud, instead of the first). Therefore, based on ACK 720, audio source 510 treats audio packet 710 as having been successfully received by earbud 520-2 and does not perform any (additional) retransmissions.

Therefore, following CIS event 530 and CIS event 531 of embodiment 700B, first earbud 520-1 has audio data needed by second earbud 520-2 and second earbud 520-2 has audio data needed by first earbud 520-1. Cross-communications 707 occur within CIG interval 705 after completion of CIS event 530 and CIS event 531. While cross-communications 707 are illustrated in embodiment 700B as occurring immediately following CIS event 531, some amount of time may elapse between CIS event 531 and cross-communications 707. Cross-communications 707 can occur on an ACL link between earbuds 520. As part of cross-communications 707, earbud 520-1 sends request 760 to second earbud 520-2 at block 794. Rather than request 760 being an empty or null packet, request 760 can include the audio data from audio packet 710. Request 760, in addition to including the audio data of audio packet 710, such as by virtue of being transmitted during CIG interval 705, is used to trigger second earbud 520-2 to transmit the audio data corresponding to audio packet 550. Following request 760 being received by earbud 520-2, earbud 520-2 has now received the audio data included in audio packet 710 and can then output audio via its onboard speaker based on the audio data at block 797 (as performed by the second earbud instead of the first earbud).

In response to request 760, earbud 520-2 sends audio packet 740 at block 795. Audio packet 740 can include the same audio data as audio packet 550, but may be re-encrypted by earbud 520-2 and use a different access address (a different access address is used since the link being used is different: from earbud 520-2 to earbud 520-1 in contrast to from audio source 510 to earbud 520-1). Therefore, while the audio content data is the same in audio packet 740 and audio packet 550, other data can vary.

Additionally, in some embodiments, ACK 750 is transmitted from first earbud 520-1 to second earbud 520-2 at block 796. In response to ACK 750, second earbud 520-2 does not attempt any retransmissions of the audio data. However, if a NAK was received instead of ACK 750, second earbud 520-2 can attempt a retransmission. Following packet 740 being received by earbud 520-1, earbud 520-1 has now received the audio data included in audio packet 550 and can then output audio via its onboard speaker based on the audio data at block 797.

In other embodiments, it may be possible that packet 760 was not properly received by earbud 520-2. In such a situation, instead of audio packet 740 being transmitted, to earbud 520-1, a NAK may be transmitted (e.g., on the ACL link). This NAK would trigger the audio data of request packet 760 to be retransmitted, and, when properly received, would result in audio packet 740 being transmitted followed by ACK 750.

Figure 8A:
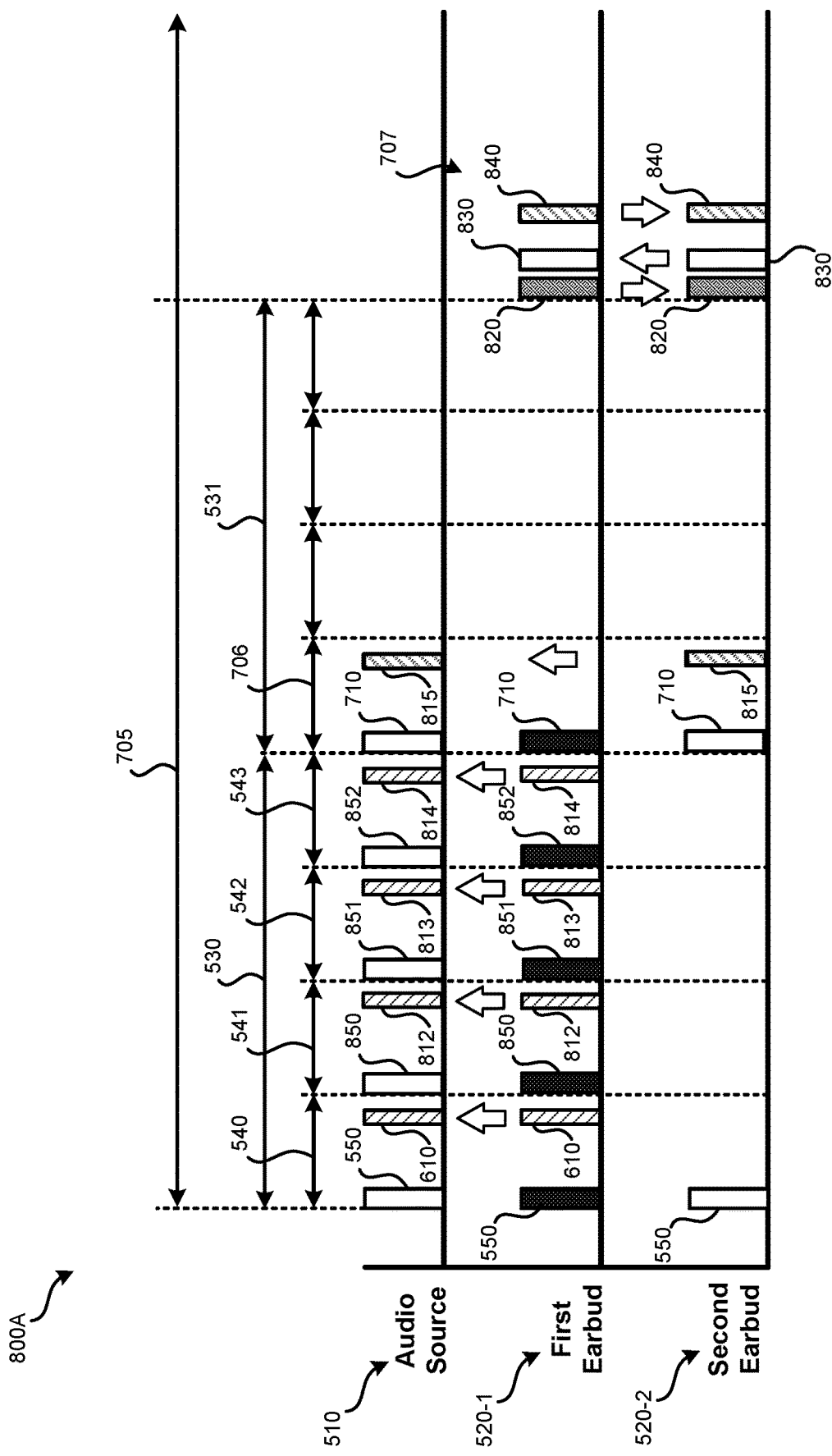
FIG. 8A illustrates an embodiment of communication between an audio source and true wireless earbuds in which the earbuds relay received data between themselves after CIS events within the CIG interval without the use of a cross-acknowledgement.
Figure 8B:
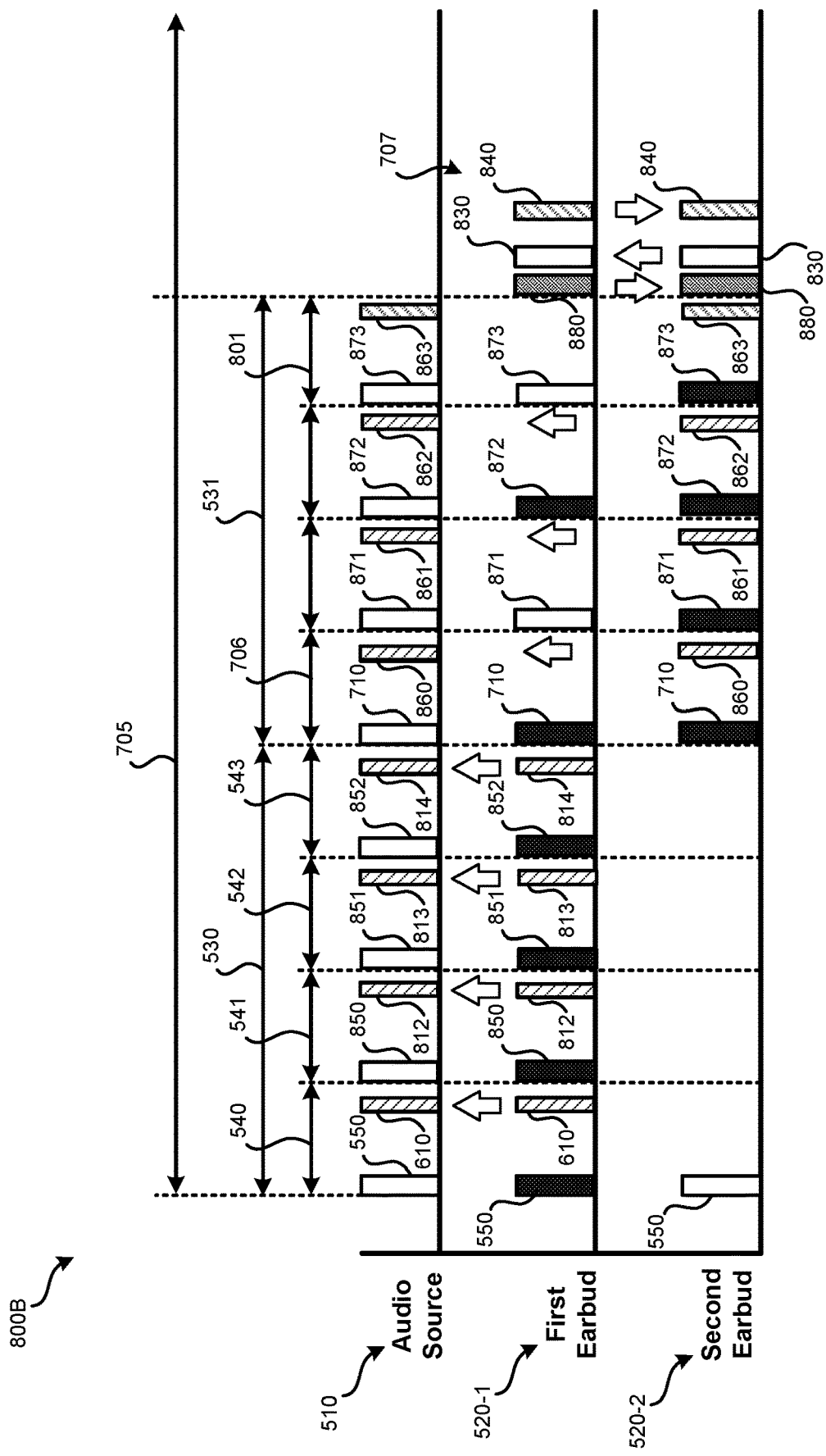
FIG. 8B illustrates another embodiment of communication between an audio source and true wireless earbuds in which the earbuds relay received data between themselves after CIS events within the CIG interval without the use of a cross-acknowledgement.
Figure 8C:
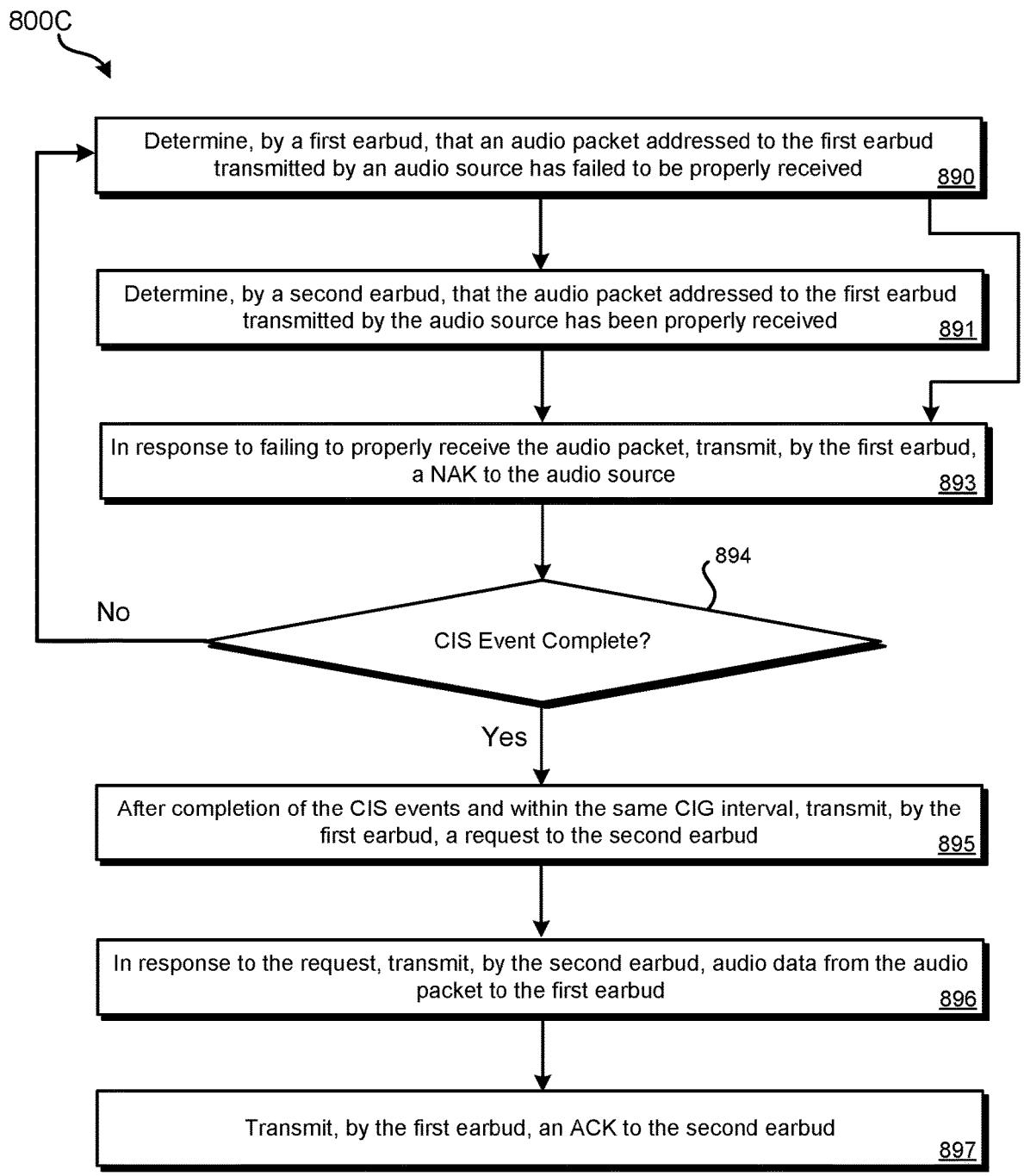
FIG. 8C illustrates an embodiment of a method corresponding to the embodiments of FIGS. 8A and 8B.

While the embodiments of FIGS. 7A-7C involve the use of a CrossACK being exchanged between earbuds 520, the embodiments FIGS. 8A-8C do not use a CrossACK. Not using a CrossACK may be less intensive on processing resources and thus may allow the arrangements of FIGS. 8A-8C to be performed using less advanced hardware.

FIG. 8A illustrates an embodiment 800A of communication between an audio source and true wireless earbuds in which the earbuds relay received data between themselves after CIS events within a CIG interval without the use of a CrossACK. FIG. 8C illustrates an embodiment of a method 800C corresponding to the embodiments of FIGS. 8A and 8B. Each block of method 800C is performed by an earbud of the pair of earbuds as detailed herein.

In embodiment 800A, as in embodiment 700A, first earbud 520-1 can represent either earbud 110-1 (a right earbud) or earbud 110-2 (a left earbud); earbud 520-2 represents the other earbud. Audio source 510 can represent an audio source, such as audio source 120, which can be a smartphone, tablet computer, laptop computer, or some other source of Bluetooth LE audio transmissions. In other embodiments, another short-range wireless communication protocol other than Bluetooth LE audio may be used. Communications may be performed in accordance with a Bluetooth protocol, such as Bluetooth LE (e.g., LE Audio).

In embodiment 800A, during subevent 540, audio source 510 transmits audio packet 550, which is addressed to only first earbud 520-1, to first earbud 520-1. Audio packet 550 is not successfully received by earbud 520-1 at block 890. As previously detailed, the reasons for this can vary, such as due to attenuation or interference. While first earbud 520-1 did not successfully receive audio packet 550, second earbud 520-2 does successfully receive (or sniff) audio packet 550 at block 891. (Once successfully received, future transmissions of the same audio data may be ignored or discarded by the second earbud, as evidenced by the arrow proceeding from block 890 to block 893.) Earbuds 520 may have required information from each other to successfully receive the packets addressed exclusively for the other earbud on a CIS meant for the other earbud (e.g. CIS timing information, CIS properties like Physical layer used, encryption keys, etc.), thus allowing sniffed packets addressed to the other earbud to be received and decrypted. Audio packet 550 can then be decrypted by earbud 520-2.

Unlike previously-detailed embodiments, no CrossACK is transmitted from second earbud 520-2 to first earbud 520-1 to alert first earbud 520-1 of the successful receipt of audio packet 550. Therefore, first earbud 520-1 does not have information indicating whether or not audio packet 550 was successfully received by second earbud 520-2. Accordingly, first earbud 520-1 behaves as if second earbud 520-2 has not successfully received audio packet 550.

In response to determining that the audio packet was not successfully received during subevent 540, earbud 520-1 sends NAK 610 to audio source 510 within subevent 540 at block 893. In response to NAK 610, audio source 510 sends a retransmission of audio packet 550 as audio packet 850 if the current CIS event still has available subevents (block 894) and the audio source has not ceased sending the audio data of the packet because a maximum number of retries has been reached. The first earbud determines whether the retransmission of the audio packet addressed to the first earbud was properly received by the first earbud. As illustrated in FIG. 8A, audio packet 850 fails to be properly received by earbud 520-1 at block 890. In response to not properly receiving audio packet 850, NAK 812 is transmitted to audio source 510 by first earbud 520-1 at block 893.

Whether or not second earbud 520-2 properly receives (sniffs) audio packet 850 is inconsequential in the illustrated embodiment since audio packet 550 was properly received as part of CIS event 530. However, if audio packet 550 was not properly sniffed by second earbud 520-2, later transmissions of audio packets 850, 851, or 852 could be sniffed.

In response to NAK 812, audio source 510 sends a second retransmission as audio packet 851 during subevent 542. As illustrated, audio packet 851 again fails to be received by earbud 520-1. (In a variation of embodiment 800A, audio packet 851 could be successfully received by earbud 520-1 and further communications, other than an ACK, may be unnecessary within CIS event 530.)

In response to not properly receiving audio packet 851, NAK 813 is transmitted by first earbud 520-1 to audio source 510. In response to NAK 813, audio source 510 sends a third retransmission of the audio data as audio packet 852. The first earbud determines whether the retransmission of audio packet 852 addressed to first earbud 520-1 was properly received by the first earbud 520-1. Again here, audio packet 852 was not properly received by first earbud 520-1, first earbud 520-1 transmits NAK 814 at block 893 to audio source 510.

Since NAK 814 was transmitted during the last subevent of CIS event 530, audio source 510 may retransmit the audio data of packet 550 again during the next CIS event for first earbud 520-1. This retransmission in the next CIS event for first earbud 520-1 may only occur if a maximum number of retransmissions has not yet been reached. If the maximum number of retransmissions has been reached, the audio packet would be skipped and a next audio packet would be transmitted.

Blocks 890 through 894 are repeated by the opposite earbud in a second CIS event as indicated by the dotted arrow. Either immediately or at some later time within CIG interval 705, second CIS event 531 occurs in which audio data is transmitted from audio source 510 to second earbud 520-2. Audio packet 710 is transmitted by audio source 510 addressed to only second earbud 520-2 during subevent 706. In the illustrated embodiment, second earbud 520-2 properly receives audio packet 710; therefore, method 800C jumps to block 895. Further, as illustrated, first earbud 520-1 fails to properly sniff audio packet 710; however, this failure is inconsequential since second earbud 520-2 properly received the audio data. In response to properly received audio packet 710, second earbud 520-2 transmits ACK 815 to audio source 510. In response to ACK 815, audio source 510 does not retransmit the audio data any additional times during CIS event 531. (In other embodiments, it may take one, two, or more retries within CIS event 531 for the audio data of audio packet 710 to be properly received by second earbud 520-2.) Following audio packet 880 being received by second earbud 520-2, earbud 520-2 can then output audio via its onboard speaker based on the audio data.

Within CIG interval 705 and after both CIS event 530 and CIS event 531 (either immediately or after some additional subevents), cross-communications 707 can occur in which first earbud 520-1 transmits request 820 to second earbud 520-2 at block 895. Request 820 can be a null or empty packet since first earbud 520-1 did not successfully sniff audio packet 710. In response to request 820, earbud 520-2 sends audio packet 830 at block 896. Audio packet 830 can include the same audio data as audio packet 550 (and audio packets 850-852) but may be re-encrypted by earbud 520-2.

Following packet 830 being received by earbud 520-1, earbud 520-1 has now received the audio data included in audio packet 550 and can then output audio via its onboard speaker based on the audio data.

In response to properly receiving audio packet 830, ACK 840 may be transmitted by first earbud 520-1 to second earbud 520-2 at block 897. In response to receiving ACK 840, no retransmissions of the audio data of audio packet 830 may be attempted by second earbud 520-2. Alternatively, if a NAK was transmitted by first earbud 520-1 to second earbud 520-2, at least one retransmission may occur.

As previously noted, due to NAK 814, audio source 510 may retransmit the audio data of audio packet 550 as part of the next CIS event for first earbud 520-1. If audio packet 830 was properly received by first earbud 520-1, this further retransmission of audio data of audio packet 550 can be ignored. Therefore, regardless of whether the further retransmission is properly received or not, first earbud 520-1 may transmit an ACK in response to audio source 510 because the audio data was properly received from second earbud 520-2.

In contrast, if for some reason audio packet 830 (and any subsequent transmissions within CIG interval 705) failed to be received by first earbud 520-1 (or second earbud 520-2 did not properly receive the audio data of audio packet 550 or its subsequent retransmissions), first earbud 520-1 may continue attempting to try to receive the audio data from audio source 510. First earbud 520-1 may continue to send NAKs if the retransmissions are not received. If the first earbud continues to fail to receive the audio packet, a maximum number of retries is reached and audio source 510 begins transmitting new audio data.

FIG. 8B illustrates an embodiment 800B of communication between an audio source and true wireless earbuds in which the earbuds relay received data between themselves after CIS events within a CIG interval without the use of a cross-acknowledgement. In embodiment 800B, as in all other embodiments detailed herein, first earbud 520-1 can represent either earbud 110-1 (a right earbud) or earbud 110-2 (a left earbud); earbud 520-2 represents the other earbud. In embodiment 800B, CIS event 530 progresses as detailed in relation to FIG. 8A: second earbud 520-2, during at least one of subevents 540-543, successfully receives the audio packet addressed to only first earbud 520-1 via sniffing, but first earbud 520-1 does not successfully receive audio packet 550 or any of its retransmissions during CIS event 530.

In contrast to embodiment 800A, during CIS event 531, second earbud 520-2 is not able to successfully receive any of audio packets 710, 871, 872, and 873 transmitted by audio source 510 and addressed to only second earbud 520-2. In response to determining the audio packets were not successfully received, NAKs 860, 861, 862, and 863 were transmitted by second earbud 520-2 in response to determining audio packets 710, 871, 872, and 873 were not successfully received. Following CIS event 531, second earbud 520-2 does not have any information about whether first earbud 520-1 successfully sniffed any of audio packets 710, 871, 872, or 873.

While audio packets 710, 871, 872, and 873 were not properly received by second earbud 520-2, first earbud 520-1 was able to successfully sniff audio packet 871 and audio packet 873. These particular packets are show as successfully received as an example only; as long as one of audio packets 710, 871, 872, and 873 was successfully sniffed, first earbud 520-1 will have the audio data stored that is needed by second earbud 520-2.

Following CIS event 530 and CIS event 531 in embodiment 800B, first earbud 520-1 has audio data needed by second earbud 520-2 and second earbud 520-2 has audio data needed by first earbud 520-1. Cross-communications 707 represents communications within CIG interval 705 after completion of CIS event 530 and CIS event 531. As previously detailed, cross-communications can occur via a different type of link between earbuds 520, such as an ACL link. While cross-communications 707 is illustrated in embodiment 800B as occurring immediately following CIS event 531, some amount of time may elapse between CIS event 531 and cross-communications 707. During cross-communications 707, earbud 520-1 sends request 880 to second earbud 520-2 at block 895. Rather than request 880 being an empty or null packet, request 880 includes the audio data from audio packet 871. Request 880, in addition to including the audio data of audio packet 871, such as by virtue of being transmitted during CIG interval 705, is used to trigger second earbud 520-2 to transmit the audio data corresponding to audio packet 550 at block 896. Following request 880 being received by earbud 520-2, earbud 520-2 has now received the audio data included in audio packet 817 (which is the same as audio packets 710, 872, and 873) and can then output audio via its onboard speaker based on the audio data.

In response to request 880, earbud 520-2 sends audio packet 830. Audio packet 830 can include the same audio data as audio packet 550, but may be re-encrypted by earbud 520-2 and use a different access address (a different access address is used since the link being used is different: from earbud 520-2 to earbud 520-1 in contrast to from audio source 510 to earbud 520-1). Therefore, while the audio content data is the same in audio packet 830 and audio packet 550, other data can vary.

Additionally, in some embodiments, ACK 840 is transmitted from first earbud 520-1 to second earbud 520-2 at block 897. In response to ACK 840, second earbud 520-2 does not attempt any retransmissions of the audio data. However, if a NAK was received instead of ACK 840, second earbud 520-2 can attempt a retransmission during subevent 708. None, one, or more subevents within CIG interval 705 may be available for transmission retries directly between earbuds. Following ACK 840 being received by first earbud 520-1, first earbud 520-1 has now received the audio data included in audio packet 550 and can then output audio via its onboard speaker based on the audio data.

In still other embodiments, it may be possible that packet 880 was not properly received by earbud 520-2. In such a situation, instead of audio packet 830 being transmitted, to earbud 520-1, a NAK may be transmitted. This NAK would trigger the audio data of packet 880 to be retransmitted, and, when properly received, would result in audio packet 830 being transmitted followed by ACK 840.

As previously detailed in relation to FIG. 8A, due to NAKs 814 and 863, the audio data transmitted as part of audio packets 550 and 710 may be retransmitted during subsequent CIS events for the corresponding earbud. Assuming that the exchange of audio data in packets 880 and 830 occurred without error, each earbud may send an ACK to the audio source in response to the retransmission of the audio data at the subsequent CISs, regardless of whether received properly or not. Alternatively, if the exchange of packets 880 and 830 failed for whatever reason, these retransmissions in later CISs can be used as further attempts to receive the audio data. Such continued attempts can occur until either the audio packet is successfully received by the respective earbud or a maximum number of retries has been reached and the audio source begins transmitting new audio data.

In addition to embodiments 800A and 800B, an embodiment is also possible in which first earbud 520-1 does successfully receive audio packet 550 (or at least one of audio packets 850-852), but second earbud 520-2 does not successfully receive audio packet 710 or 871-873. In such an embodiment, request 880 can still include the audio data from audio packet 710. Any audio data sent back from second earbud 520-2 to first earbud 520-1 would not be needed and could be ignored by first earbud 520-1. Alternatively, such audio data may not be transmitted. ACK 840 could still be transmitted to second earbud 520-2.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known, processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A short-range communication system, comprising:
a pair of wireless earbuds, comprising:
a first earbud, comprising a first speaker, a first processing system, and a first wireless communication interface, that communicates with an audio source device using short-range wireless communications; and a second earbud, comprising a second speaker, a second processing system, and a second wireless communication interface, that communicates with the audio source device using short-range wireless communications, wherein:
- the first earbud and the second earbud are not physically connected together and the pair of wireless earbuds are not physically connected with the audio source device; and
- the first earbud and the second earbud are configured to wirelessly communicate with each other to acknowledge receipt of audio packets from the audio source device;
- the second processing system of the second earbud is configured to, in response to successfully receiving a first audio packet addressed to the first earbud transmitted by an audio source, cause a cross acknowledgement to be transmitted directly to the first earbud by the second wireless communication interface, the cross acknowledgement indicating that the first audio packet was successfully received by the second earbud; and
- the first processing system of the first earbud is configured to:
  - determine that the first audio packet addressed to the first earbud failed to be properly received;
  - receive the cross acknowledgement transmitted by the second earbud; and
  - in response to receiving the cross acknowledgement and determining that the first audio packet failed to be properly received by the first earbud, cause an acknowledgement to be transmitted to the audio source.

2. The short-range communication system of claim 1, wherein the cross acknowledgment is transmitted by the second earbud within a connected isochronous stream (CIS) subevent in which the first audio packet was received by the second earbud.

3. The short-range communication system of claim 2, wherein the first processing system of the first earbud is configured to:
- determine that the first audio packet addressed to the first earbud failed to be properly received during the CIS subevent.

4. The short-range communication system of claim 3, wherein the first processing system of the first earbud is configured to:
- receive the cross acknowledgement transmitted by the second earbud within the CIS subevent.

5. The short-range communication system of claim 3, wherein the first processing system of the first earbud is configured to:
- in response to receiving the cross acknowledgement and determining that the first audio packet failed to be properly received by the first earbud, cause a request to be transmitted to the second earbud.

6. The short-range communication system of claim 5, wherein the request is transmitted by the first earbud within a CIS event in which the cross acknowledgment was transmitted by the second earbud.

7. The short-range communication system of claim 6, wherein the second processing system of the second earbud is configured to:
- in response to receiving the request from the first earbud, cause audio data from the first audio packet received from the audio source to be transmitted directly to the first earbud.

8. The short-range communication system of claim 7, wherein the audio data is transmitted during a same CIS event by the second earbud as during which the request was received by the second earbud.

9. The short-range communication system of claim 1, wherein the short-range communication system further comprises the audio source device, wherein the audio source device is a smartphone.

10. A method for short-range wireless communication, the method comprising:
- determining, by a first earbud of a pair of earbuds, that an audio packet addressed to the first earbud from an audio source was not properly received;
- receiving, by a second earbud of the pair of earbuds from the audio source, the audio packet addressed to the first earbud;
- transmitting, by the second earbud directly to the first earbud, a cross acknowledgement indicating that the second earbud properly received the audio packet addressed to the first earbud;
- receiving, by the first earbud directly from the second earbud, the cross acknowledgement indicating that the second earbud properly received the audio packet addressed to the first earbud; and
- based on the cross acknowledgement, transmitting, by the first earbud, an acknowledgment to the audio source indicating the audio packet was properly received despite having determined that the first earbud did not properly receive the audio packet.

11. The method for short-range wireless communication of claim 10, further comprising:
- transmitting, by the first earbud directly to the second earbud, a request for audio data from the audio packet.

12. The method for short-range wireless communication of claim 11, further comprising:
- transmitting, by the second earbud directly to the first earbud, the audio data from the audio packet in response to the request.

13. The method for short-range wireless communication of claim 12, wherein the cross acknowledgment is transmitted by the second earbud within a CIS subevent in which the audio packet failed to be properly received by the first earbud.

14. The method for short-range wireless communication of claim 13, wherein the request is transmitted by the first earbud within a CIS event in which the cross acknowledgment was transmitted by the second earbud.

15. The method for short-range wireless communication of claim 14, wherein Bluetooth LE Audio is used for communication between the audio source and the pair of earbuds.

16. The method for short-range wireless communication of claim 14, wherein the request is transmitted by the first earbud within a final subevent of a plurality of subevents within the CIS event.

17. The method for short-range wireless communication of claim 16, wherein the audio packet is audio corresponding to a telephone call in which the audio source is functioning as a call gateway and the pair of earbuds is functioning as a call terminal.

* * * * *